Aug. 15, 1972 L. V. COLWELL 3,684,673
METHOD AND APPARATUS FOR ANALYZING AND CONTROLLING
THE CLEANING OPERATION OF AN ELECTROCHEMICAL
GRINDING DEVICE
Filed June 29, 1970 9 Sheets-Sheet 1
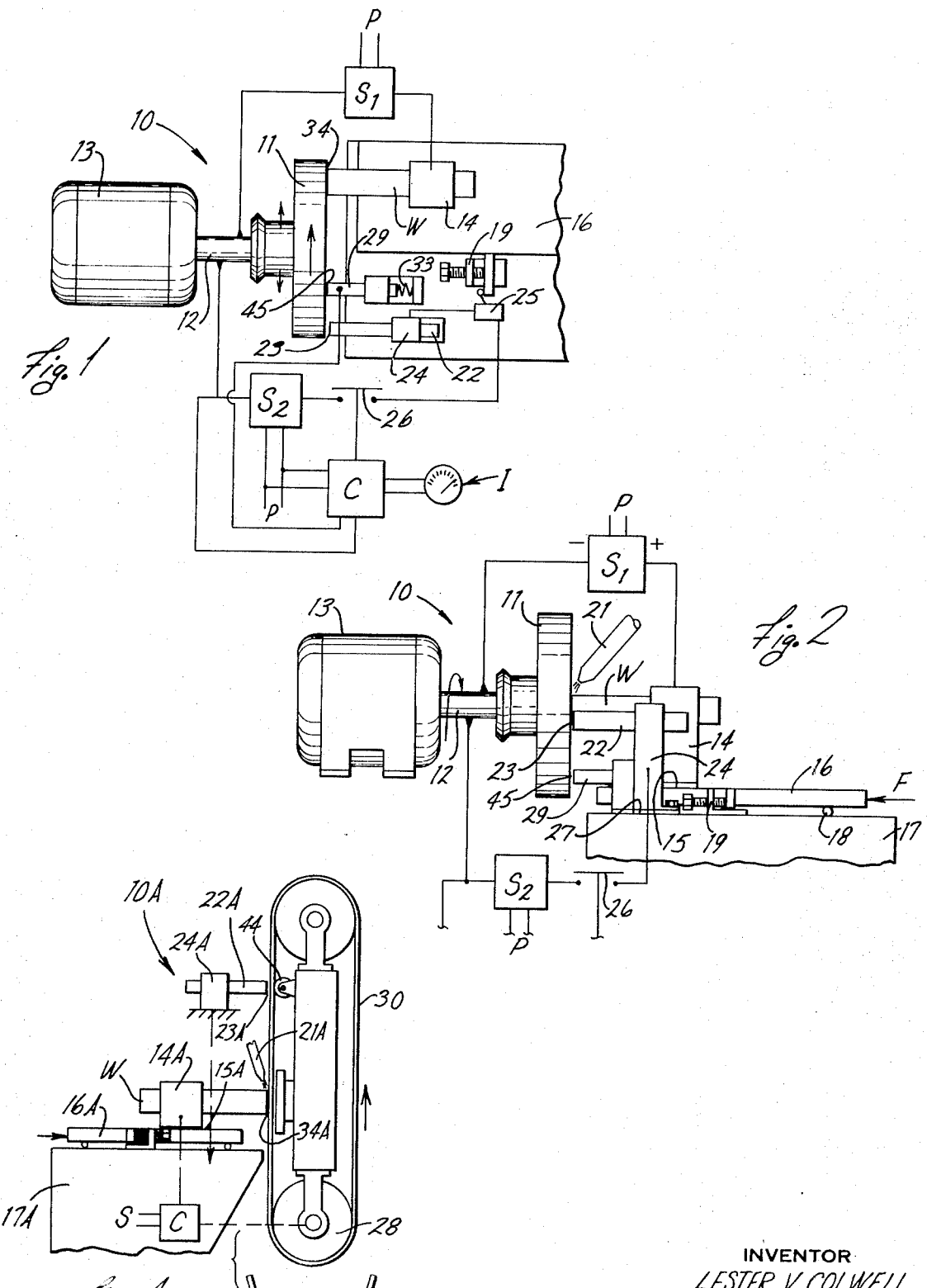
INVENTOR
LESTER V. COLWELL
BY
Woodhams, Blanchard & Flynn
ATTORNEYS

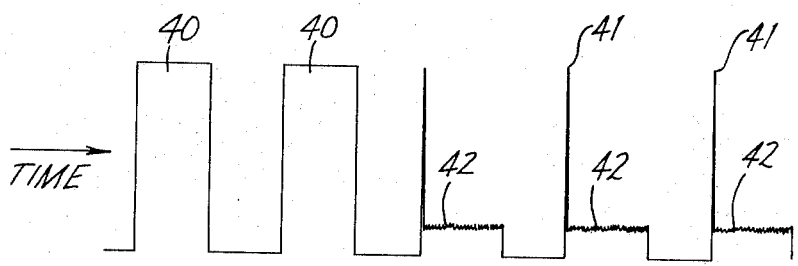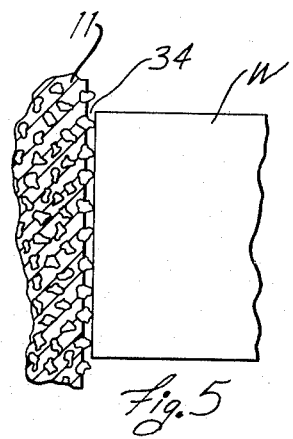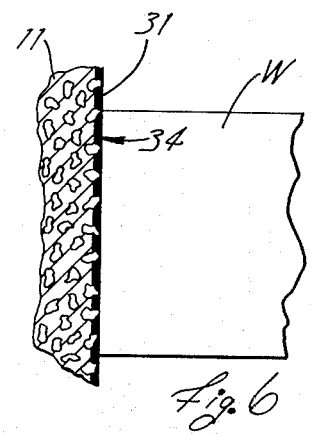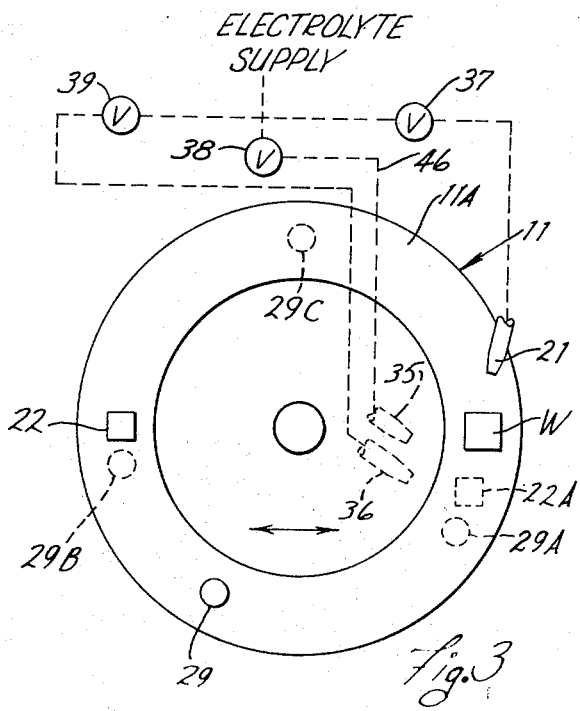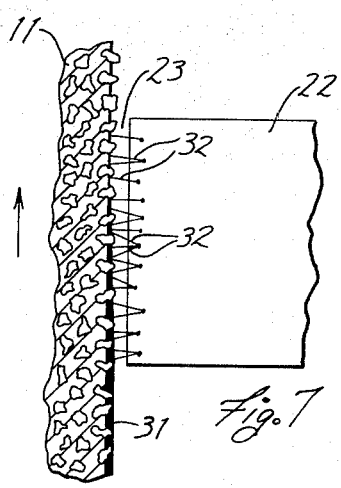

Aug. 15, 1972 L. V. COLWELL 3,684,673
METHOD AND APPARATUS FOR ANALYZING AND CONTROLLING
THE CLEANING OPERATION OF AN ELECTROCHEMICAL
GRINDING DEVICE
Filed June 29, 1970 9 Sheets-Sheet 8

INVENTOR
LESTER V. COLWELL
BY
Woodhams, Blanchard & Flynn
ATTORNEYS

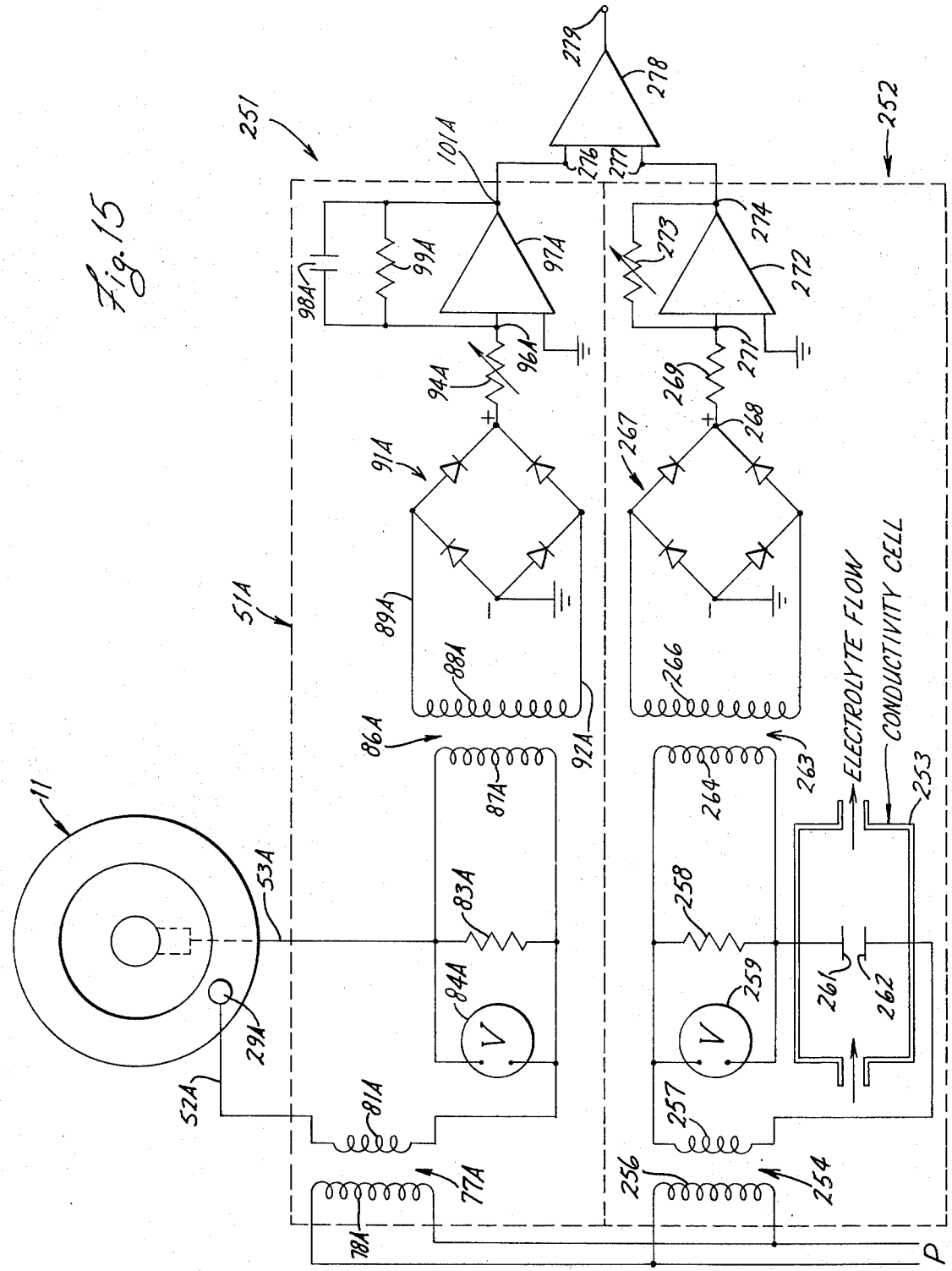

United States Patent Office 3,684,673
Patented Aug. 15, 1972

3,684,673
METHOD AND APPARATUS FOR ANALYZING AND CONTROLLING THE CLEANING OPERATION OF AN ELECTROCHEMICAL GRINDING DEVICE
Lester V. Colwell, Ann Arbor, Mich., assignor to Hammond Machinery Builders, Inc., Kalamazoo, Mich.
Continuation-in-part of application Ser. No. 687,848, Dec. 4, 1967. This application June 29, 1970, Ser. No. 50,826
Int. Cl. B23p 1/00, 1/02
U.S. Cl. 204—129.2      23 Claims

ABSTRACT OF THE DISCLOSURE

The invention relates to an electrochemical grinding machine of the type having (1) a driving unit driving a grinding device in contact with an electrochemically erodable workpiece, said grinding device comprising electrically non-conductive, or substantially non-conductive, abrasive grain embedded in and projecting from an electrically conductive matrix, (2) means for supplying an electrolyte to the zone (interstices between the abrasive grains) between the grinding device and the workpiece and (3) first potential source means for supplying an electrical potential between said grinding device and said workpiece. According to the invention such machine is further provided with (1) a cleaning electrode for cleaning said grinding device, (2) further potential source means for applying an electrical potential between said cleaning electrode and said grinding device and (3) a sensing electrode and circuitry therefor to analyze and control the conditions on the grinding device. Said cleaning electrode is spaced from said workpiece in a direction parallel to the working face of said grinding device and is spaced from said grinding device in a direction perpendicular to the working face thereof. Said last-named potential source means is responsive to the conditions detected by the sensing electrode and circuitry therefor to control the duration of current flow from the last-named potential source means to the cleaning electrode. The last-named potential source means may be of either fluctuating or intermittent nature and of either constant or alternating polarity. The spacing of the cleaning electrode from the grinding device, the conductivity of the electrolyte, the magnitude and polarity of said further potential source means either steady or pulsed, are all chosen and balanced to effect sufficient sparking between said cleaning electrode and said grinding device to keep said grinding device at least substantially free of waste material which can otherwise accumulate thereon but without appreciably eroding said grinding device. Where a deplating mode of cleaning is preferred, appropriate parameters are selected to effect the desired deplating but without excessively exposing the abrasive grain.

This application is a continuation-in-part application of Ser. No. 687,848, filed Dec. 4, 1967, and now abandoned.

FIELD OF THE INVENTION

This invention relates to electrochemical, sometimes referred to in the trade as electrolytic, grinding apparatus and, more particularly, relates to a method and apparatus for keeping the grinding device relatively free from an undesirable buildup of waste material which otherwise can accumulate thereon.

DESCRIPTION OF THE PRIOR ART

Electrochemical grinding (sometimes hereinafter referred to as ECG) is a relatively new process that has already become firmly established in industry and is experiencing an expanding scope of application. The demonstrated economic advantages and production capabilities of the process have stimulated considerable research toward a more complete understanding of how the process works in order to improve known applications, implement new applications and to realize the economic potential that is increasingly evident. However, one must conclude from the current technical literature that a complete understanding of the principles involved has not yet been attained despite the fact that laboratories in several parts of the world are continually reporting new, interesting and useful facts and results. This means that the process is more complex than was first realized.

As in electrochemical machining (ECM), electrolysis plays a major role in ECG. It is evident in both of these processes that the simple expression of Faraday's laws of electrolysis describes much but not all of the phenomena involved. In other words, both processes appear to have many more side effects, both electrical and chemical, than can be accounted for by simple electrolysis. Furthermore, the various phenomena in electrochemical grinding are very sensitive to the surrounding mechanical environment, referring particularly to variations in temperature, gas pressure, electrolyte, local contact pressures, potential and other factors.

It has been known that ECG can be carried out under conditions wherein the workpiece is very quickly ground. The optimum rate of material removal, under known preferred conditions of workpiece pressure, gap spacing between the workpiece and grinding device, electrolyte character and supply, occurs in many instances at low voltages in the range of 5 to 8 volts. In some instances, however, a higher voltage, such as 10 to 15 volts, is required. The grinding device is usually an abrasive wheel, belt or disk having an electrically conductive matrix, such as metal; that is, the wheel, belt or disk has a metal matrix from which protrudes a multitude of abrasive grains which are generally referred to as being "nonconductive" but which may be of limited electrical conductivity provided only that they are of at least appreciably less conductivity than the workpiece, the matrix and the electrolyte used therewith. (In the case of a wheel, the matrix is called in the trade the "bond.")

Such grinding devices under the usual conditions of operation, particularly low voltage or pure D.C. supply, will accumulate a layer of waste material thereon. This increases the resistance of the path between the workpiece and the grinding device and thereby diminishes the amount of current flowing across said path with a resulting drop in the rate of material removal. Such accumulation of waste material also can result in an increase in deleterious sparking and poor workpiece finish. The decrease in current flow may be sensed by an ammeter suitably connected into the circuit, which ammeter should be frequently observed by the operator to determine when an excessive buildup of waste material has occurred on the grinding device and cleaning thereof is necessary. In practice, however, the operator usually determines the existence of waste material buildup on the grinding device by much less accurate means, such as excessive sparking, wheel appearance, workpiece finish, reduced rate of material removal or even the sound of the operation, said latter being particularly a sparking of a recognizable crackling nature. Since this is a matter of judgment on the part of the operating personnel, the practical result is either that the grinding device is sometimes cleaned too often which results in excessive consumption of the abrasive grain on the grinding device or that the grinding device is not cleaned often enough which results in excessive sparking and consequent damage to the workpiece and the grinding device. When such abrasive grains are diamonds, the excessive consumption thereof results in an increasing cost which destroys much of the economic advantage of the ECG process.

In addition to the timing or scheduling of the cleaning operations, the cleaning procedure itself raises further problems. For such cleaning, the operator will usually apply a conventional abrasive stick to the wheel which usually cleans same effectively. However, this stick must be carefully selected and applied to abrade slowly and, if improperly selected or if unskillfully used, may remove too much of the matrix so that the diamonds protrude too far. This creates excessive mechanical grinding and hence greater wear of the grinding device, i.e. greater consumption of diamonds, and again destroys much of the economic advantage of the ECG process. Alternatively, if the abrasive stick is not effective the operating personnel can interrupt the grinding procedure, reverse the polarity of potential between the workpiece and the grinding device and deplate the accumulated buildup of waste material from the grinding device. This, however, also requires a certain degree of experience on the part of such personnel inasmuch as an excessive amount of such deplating will attack the grinding device itself, particularly the matrix, and effect a further undesirable erosion thereof and consequent further exposure and loss of abrasive grain.

Another approach sometimes applied to the problem of waste material removal is to increase the potential between the workpiece and the grinding device sufficiently to cause limited sparking between the grinding device and the workpiece. This, if properly done, can assist in keeping the grinding device relatively clean. However, this requires considerable experience on the part of the operating personnel because at too high a potential a level of sparking occurs which damages both the grinding device and the workpiece.

Some present power supply equipment incorporates a control which senses excessive sparking only and automatically reduces voltage. However, this control does not sense or provide the correct sparking level needed for cleaning the grinding device. Particularly, the maintenance of any given voltage drop between the workpiece and the grinding device is in part a function of the pressure between the workpiece and the grinding device. Since this pressure is in turn a function of the rate at which the workpiece is being fed, it requires, regardless of whether the feeding is by hand or mechanically, a certain degree of experience and attention on the part of the operator to control said feeding rate at the proper value to maintain said pressure, voltage drop and sparking at the desired amount for minimizing the loading of the grinding device with waste materials but without damage to the grinding device. While such feeding control on the part of the operator is a theoretical possibility, and may be approximately attained in the laboratory, it is not always attained to optimum efficiency in practice.

One known device utilizes a separate electrode for removing the undesirable buildup of waste material on the grinding device. However, the electrical circuitry for producing an effective operation of such cleaning electrode is not capable of (1) analyzing the condition of the grinding device and (2) controlling the duration of the cleaning operation. It is well recognized that a skilled workman can control quite well the conditions on such a grinding device, but when products require a grinding operation in a mass production operation, experienced personnel are not always available and inexperienced personnel are often utilized in order to perform the grinding operation. It is well known that in electrical-chemical grinding a wheel will undergo an undesirable buildup of waste material, if the workman is not watching the wheel, in a matter of seconds, often about fifteen seconds. However, a workman, especially inexperienced workmen, pays most of his attention to the tool and the workpiece attempting to grind the workpiece to a specific dimension. As a result, little or no attention is paid to the grinding device during the time that the workman is applying the finishing dimension to the workpiece. Accordingly, apparatus is highly desirable which will automatically detect when the grinding device needs cleaning, detect how much cleaning is needed, and perform the cleaning operation according to the detected information.

If the grinding device is kept clean under operating conditions, assuming that one obtains the optimum voltage drop between the workpiece and the grinding device, the operating efficiency and production rate can be held at their optimum levels. Further, if such cleaning of the grinding device could be maintained by automatically controllable means and thereby freed from dependence upon the judgment of the operating personnel, actual production obtained from a given machine under ordinary production conditions would be further improved.

Accordingly, the principal objects of this invention are:

(1) To provide electrochemical grinding method and apparatus capable of a high rate of material removal from the workpiece and at the same time preventing the grinding device from loading up with waste material.

(2) To provide electrochemical grinding method and apparatus wherein normal waste material accumulation on the grinding device can be readily removed.

(3) To provide a method and apparatus as aforesaid in which said removal may be effected by a deplating technique.

(4) To provide a method and apparatus as aforesaid in which said removal may be by a spark discharge technique.

(5) To provide a method and apparatus as aforesaid which may be carried out simultaneously with the occurrence of a grinding operation and without interfering with same.

(6) To provide a method and apparatus as aforesaid which will be readily subject to automatic control and to provide such control.

(7) To further provide electrochemical grinding apparatus which is simple to operate so that the attention on the part of the operator may be less than is presently required.

(8) To provide apparatus, as aforesaid, which may be easily adapted to use on present electrochemical grinding machines.

(9) To provide apparatus, as aforesaid, which can automatically analyze the condition of a grinding device to determine if a cleaning operation is required and then perform the cleaning operation in response to the results of the analysis all without requiring the control of the operator.

Other objects and purposes of this invention will be apparent to persons acquainted with apparatus of this general type upon reading the following specification and inspecting the accompanying drawings.

BRIEF DESCRIPTION OF THE DRAWINGS

FIG. 1 is a schematic top view of an electrochemical grinding apparatus having an automatic control over the intensity and duration of the electrical energy applied to the cleaning electrode;

FIG. 2 is a schematic side view of the device of FIG. 1;

FIG. 3 is a diagrammatic front elevation of the wheel showing the locations of cleaning and sensing electrodes with respect thereto;

FIG. 4 is a schematic side view of an electrochemical abrasive belt grinding apparatus;

FIG. 5 is an enlarged fragmentary sectional view of the grinding device and the workpiece;

FIG. 6 is an enlarged fragmentary sectional view of the grinding device and the workpiece showing waste material collected on the grinding device;

FIG. 7 is an enlarged fragmentary sectional view of the grinding device and the cleaning electrode;

FIG. 9 is a typical oscillogram showing the voltage pattern appearing between the cleaning electrode and the grinding device when same is supplied with unidirectional, spaced, square wave pulses of the frequency and pulse width indicated;

FIG. 15 is a schematic electrical diagram illustrating an alternate analyzing circuit.

SUMMARY OF THE INVENTION

Figure 8:
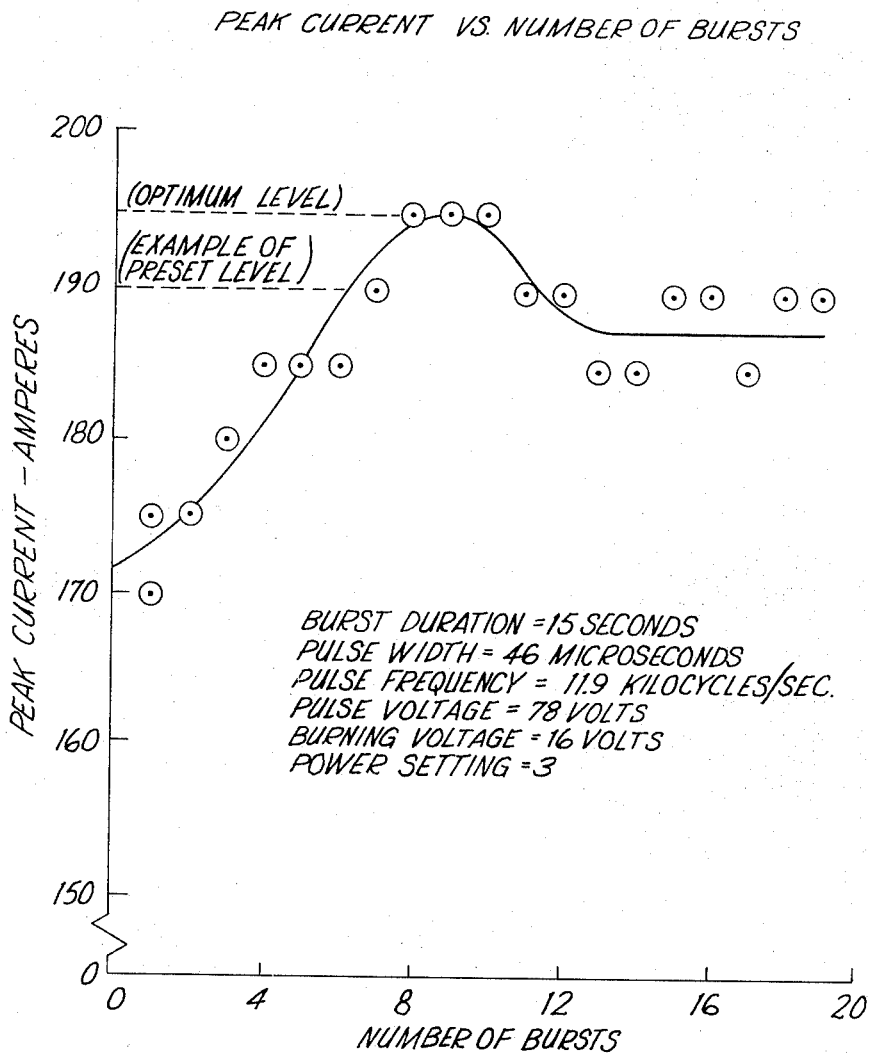
FIG. 8 is a graph showing in amperes of current conducted the results of cleaning the wheel according to the invention.

In general, the objects and purposes of the invention are to improve the operation of an ECG machine of the usual type, namely, one having a driving unit driving a grinding device in contact with a workpiece, means for supplying electrolyte to the space (interstices between abrasive grains) between the grinding device and the workpiece and a first source of electrical potential applying a potential of substantially constant polarity and magnitude between said workpiece and said grinding device. The invention essentially comprises adding to such a machine an automatic analysis and control for a cleaning electrode spaced from the position occupied by the workpiece in a direction along the working face of the grinding device, positioned close to the grinding device and adjustable in a direction perpendicular to the working face of said grinding device. Means are provided for imposing a second electrical potential, independent of said first potential, between said cleaning electrode and said grinding device which potential may be either fluctuating or intermittent and may be of either constant or alternating polarity. Means are provided for analyzing the condition of the grinding device to determine if a cleaning operation is required and then controlling the duration of the application of the second electrical potential between the cleaning electrode and the grinding device to clean the grinding device according to the analyzed information. The spacing of the cleaning electrode from the grinding device, the conductivity of the electrolyte, the magnitude and the polarity of said second potential source and the duration, either steadily or in pulses, of current flow are all selected and balanced to effect sufficient sparking between said cleaning electrode and said grinding device to keep said grinding device free, or substantially free, of waste material without appreciably eroding said grinding device. Where a deplating mode of operation is preferred for cleaning of the grinding device, appropriate parameters are selected to effect the desired deplating but without excessively exposing the abrasive grain.

DESCRIPTION OF ONE PREFERRED EMBODIMENT

Referring to FIG. 1 there is schematically illustrated a conventional ECG apparatus 10 essentially as set forth in the U.S. patent to Keeleric, No. 2,826,540, and having the apparatus of the invention applied thereto. In said device, a grinding device 11, here an abrasive wheel, is mounted on a rotatable shaft 12, which shaft is driven by a motor 13. A workpiece W is supported by a suitable fixture 14 which in turn may be mounted on a table 16. In the particular machine schematically illustrated in FIGS. 1 and 2, said table 16 is mounted on suitable means such as rollers, of which one is indicated at 18, onto a frame 17 which is further supported in a convenient manner. Electrical insulation is provided somewhere between the workpiece W and said frame, such as the insulation 15 shown between the fixture 14 and the table 16. Said frame 17 is provided with a stop 19, preferably adjustable, for limiting the distance the table 16 can move toward the grinding device 11 in response to a feeding source F. Said feeding force F may be applied to the table 16 either manually or mechanically as desired, for example, as illustrated in detail in the U.S. Patent to Bass et al. No. 2,988,858 or to Krueger No. 2,988,862 and thereby causes the workpiece to bear against the abrasive grain of the grinding device with a controllable pressure. A space 34, comprising the interstices between the abrasive grains, nevertheless exists between the workpiece and the metal matrix of the grinding device and is hereinafter referred to as a working gap.

A nozzle 21 supplies electrolyte to the grinding zone as further described in said Keeleric patent. The positive side of a source $S_1$ of low voltage D.C. potential is connected either directly to the workpiece W or it may be applied as convenient to the workpiece W through the fixture 14, as shown. The negative side of the source $S_1$ is connected to the shaft or spindle on which the grinding device 11 is mounted by means which, for example, may be the same as that disclosed in U.S. patent to Robischung et al. No. 3,115,454. Said source $S_1$ may be of any convenient source of essentially ripple-free D.C. potential, which may be supplied by storage batteries but, in the practical case, is more usually supplied by an adequately rectified commercial line potential.

The foregoing refers to a typical ECG apparatus utilizing a metal-bonded grinding wheel as the grinding device. It is recognized, of course, that other types of grinding devices already known in EC processes may be used with the above-discussed ECG apparatus, such as the abrasive belt means shown in U.S. patent to Bell, No. 3,162,588 and U.S. Pat. No. 3,334,041.

Thus, while the following discussion will proceed primarily in terms of a face wheel of generally planar nature, it will be recognized that the invention may also be applied to a variety of other grinding devices employing electrochemical erosion principles, particularly referring as examples to other worms of face wheels, abrasive disks and belts or peripheral wheels in different configurations having either a flat or a contoured face. However, the manner of application is sufficiently illustrated by the discussion herein based on face wheels and belts so that further detailing is unnecessary. Thus, the particular illustrations used will be understood as illustrative only and not limiting.

Referring now to FIG. 5, the workpiece W is shown in contact with the abrasive grains of a clean grinding device 11. In FIG. 6 the waste material 31 is shown collecting in the interstices between the abrasive grains of the grinding device 11 in the working gap 34 between the grinding device and the workpiece W. The effect of such waste material accumulation, probably at least in part is due to its low conductivity, limits the current flow between the grinding device 11 and the workpiece W and, as a result, interferes with the electrochemical process.

The prior art is already acquainted with a cleaning electrode 22 (FIGS. 1–3) positioned closely adjacent the grinding device 11 and spaced along the working face of the grinding device from the workpiece W. However, the prior art does not appear to be acquainted with a cleaning electrode which can be turned on and off as a function of the condition of the grinding device 11. The means for accomplishing this purpose will be set forth in more detail hereinbelow. Referring now to the details of the mounting of the cleaning electrode 22 and the source of energy therefor, said cleaning electrode 22 is spaced perpendicularly from the working surface of the grinding device 11 to define a cleaning gap 23 therebetween, the importance and characteristics of which will be discussed further hereinafter. The cleaning electrode 22 is adjustably mounted onto the frame 17, with suitable electrical insulation as indicated at 27, and is connected to an energy source $S_2$. Said source $S_2$ may be independent of energy source $S_1$ or it may be suitably derivable therefrom. However energized, the source $S_2$ may be of at least two types, namely, a source of constant potential or a source of variable potential, which latter can be either alternating or pulsing. Which of these types of sources is chosen will depend upon the basic mechanism selected for effecting the desired wheel conditioning. Where it is desired to effect such wheel conditioning primarily by a deplating technique, an electrical source of suitable voltage characteristics will be chosen, and the same will then be controlled by sensing means to continue the deplating operation so long as the electronic performance criterion being measured by the sensing means (such as the resistance across the working gap 34 or the hereinafter discussed sensing gap 45) continues to improve. In some situations, this may result in only partial removal of the accumulated waste material while in others this could mean the removal of not only all of the waste material but some portion of the base metal before optimum performance is achieved. Thus the control of the cleaning electrode may be not only that of wheel cleaning but may include also the objective of wheel conditioning or optimizing.

Heretofore, it has often been difficult for a machine operator, even an experienced one, to detect the condition of the grinding device by watching the ammeter measuring working current. This problem is due to a variation in the working current caused by variations in the effective cross sectional area between the workpiece W and the grinding device 11. The effective cross sectional area will vary from workpiece to workpiece and even on a single workpiece. Noticeable variations in the working current may also be caused by oscillations of the grinding device 11. This has been observed as being at least partially caused by a forced reversal of the grinding device 11 which produces variations in the working gap dimension. Therefore, conventional sensing means, such as means detecting the condition in the working gap 34 do not work satisfactorily. However, the sensing means employed herein and discussed in more detail below do operate satisfactorily and eliminate the burden on the operator to judge the condition of the grinding device 11.

In those instances where the cleaning is to be carried out by spark discharge techniques, the source $S_2$ would be basically a generator for short pulses of either A.C. nature or of a properly controlled pulsed D.C. nature, such control being carried out in any presently known manner for the control of pulse frequency, pulse power and pulse duration.

First, it is important that the potential supply for the electrical spark discharge be of pulsing nature since otherwise a sustained arc could occur which would not only overdo the removal almost instantly but damage both the wheel and the cleaning and/or conditioning electrode. Secondly, the pulse duration should be very short in the interest of limiting the removal to small, discrete and essentially round craters. Thus, a desirable pulse width would be of the order of only a few microseconds in duration since, at the usual rotative velocities, the wheel of a frequently used size, as a wheel of eight inches in diameter, moves across the face of the electrode about 0.001 inch in one microsecond.

The voltage of free-running pulses should be high enough to assure penetration through the cleaning gap 23 at each successive pulse. Pulse energy is a function of the burning voltage and characteristics of both the generator and the cleaning gap. Variable frequency is the preferred means of control over the rate of removal. Thus the desired characteristics should result in low energy pulses of very short duration over a controllable and broad range of frequencies or repetition rates.

FIG. 8 illustrates a typical operation brought about by sucessive bursts of pulsed discharges for periods of 15 seconds per burst. Individual pulses lasted 46 microseconds each and occurred at a frequency of 11.9 kilocycles per second. This procedure results in an optimum cleaning and/or conditioning of the wheel.

FIG. 9 illustrates the time and voltage characteristics of both the free-running and the "burning" pulses at typical conditions such as used to produce the results shown in FIG. 8. The conditioning illustrated in FIG. 8 was obtained with the wheel connected as a cathode. Similar results can be obtained with the wheel as the anode.

The application of said potential from the source $S_2$ to the cleaning electrode 22 may be in response to a switch 26 automatically controlled by a suitable control C which is sensitive to a resistance selected so that its magnitude will represent the condition of the grinding device. If desired, automatic means, such as a microswitch 25, may be provided for opening the circuit to the cleaning electrode 22 when the workpiece W is retracted.

In the embodiment illustrated in FIGS. 1 and 2, there is provided an additional, or sensing, electrode 29 which is hard, as nonerosive as possible, and preferably of constant cross-sectional area. Said sensing electrode is mounted in any convenient manner preferably to be spaced a predetermined amount from the wheel surface. One method is to bring the sensing electrode into contact with the wheel and then to back it away a known amount, as a few thousandths of an inch. In such case the control C measures the resistance between said sensing electrode 29 and the matrix, of the grinding device 11. The interstitial space between the abrasive grains between said sensing electrode and the matrix of the grinding device is sometimes hereinafter designated as a sensing gap 45. The preferable criteria for positioning the sensing electrode 29 relative to the grinding device 11 is to make the sensing gap dimension constant and to have the electrolyte distributed consistently in the sensing gap 45. Another way of maintaining a constant gap dimension is to utilize a hollow sensing electrode and pump electrolyte through the sensing electrode so that the pressure of the electrolyte will urge the electrode away from the grinding device 11 a predetermined dimension. This type of structure also results in a maintaining of an even and consistent supply of electrolyte in the sensing gap 45.

Power source $S_2$ and control C are here shown as both energized from any suitable source P of line potential. In FIG. 1, the control C is shown as being provided with an indicator I which may be arranged in any of many known ways for providing a constant indication of the condition of the wheel. In the present instance, said indicator may be divided into two areas such as green for a satisfactory wheel and red for a wheel which needs conditioning. Other color codings are of course known and may be utilized as desired.

In the embodiment of FIGS. 1 and 2, the particular arrangement of the cleaning and sensing electrodes with respect to the wheel may take several forms but typical installations are illustrated in FIG. 3 in connection with the grinding device 11 here shown as having a diamond impregnated annular area 11A of common and well-known type. The workpiece W is normally mounted as shown adjacent one side of the wheel with an adequate supply of electrolyte provided in any convenient and conventional manner such as by a sprayer or through the nozzle 21 as above mentioned. The wheel may, and normally will, oscillate in a conventional manner. The cleaning electrode 22 is preferably in such case located so as to traverse the abrasive impregnated portion thereof upon oscillating of the wheel in the same manner as same is traversed by the workpiece. Alternatively, the cleaning electrode may be of bar shape and aligned with the direction of oscillation, or otherwise provided with at least one dimension of sufficient magnitude and arrangement, that it will extend fully across the abrasive impregnated portion 11A at one side of the wheel at its maximum oscillation and hence be in contact with all of said portion 11A continuously under all conditions of operation.

Further, it should be located so as not to interfere with the supply of electrolyte to the workpiece nor to have its own supply of electrolyte interferred with by the workpiece. Thus, one advantageous location for the cleaning electrode 22 is diametrically opposite the workpiece W as shown in FIG. 3. Of course, said cleaning electrode 22 may be located in many possible additional places, particularly if the wheel is of a nonoscillating type. However, whether oscillating or not, if it is located in a position, such as at point 22A, that its electrolyte supply would be interferred with by the workpiece W, a separate supply of electrolyte is preferably provided, such as by the nozzle 35 or by pumping through a longitudinal hole in the sensing electrode. Such nozzle 35 may be supplied from the same supply as is provided for nozzle 21 as indicated by the broken line 46. If desired, separate controls schematically indicated by the valves 37 and 38, may be provided for independently controlling the supply of electrolyte to said nozzles.

The sensing electrode 29 can be placed in any location where the wheel conditions will be virtually the same as at the workpiece W or where the conditions can be simulated reasonably closely to those existing at the workpiece W. Thus it is preferably located somewhere, as indicated by the solid line circle 29 in FIG. 3, in the travel of the wheel after it has passed workpiece W and before it has reached the cleaning electrode 22. However, it should not be too close to the workpiece W, such as at 29A, or the supply of the electrolyte on the wheel will be diminished by the presence of the workpiece W unless here too a separate supply of electrolyte is provided for the sensing electrode, such as by the nozzle 36. In such case, the electrolyte supply to the nozzle 36 may, if desired, also be controlled by the valve 39 independently of the electrolyte supplied to the workpiece and to the cleaning electrode.

While the sensing electrode should, preferably, like the other electrodes, be enabled to travel across the entire face of the abrasive impregnated portion 11A of the wheel during the oscillation thereof, it will be acceptable in most cases merely to locate the sensing electrode somewhat more centrally thereof on the justifiable assumption that the sample thereby obtained will be a fair representation of the entire annular strip 11A. Thus, the location indicated at 29 in FIG. 3 is normally acceptable in that it is far enough from the workpiece W as not to need a separate supply of electrolyte, sufficiently spaced from the location of cleaning electrode 22 as not to interfere with electrolyte on the face of the wheel approaching said location of cleaning electrode 22 and spaced sufficiently from the bottommost point of the wheel to obtain at least a small amount of benefit from the oscillating function of the wheel. However, the location 29A is also acceptable if a separate supply of electrolyte is provided for the sensing electrode and it has the advantage that at this location the sensing electrode traverses better than at 29 the width of the face 11A in response to oscillation of the wheel. The location 29B is acceptable for the same reason but in this case the cleaning electrode 22 should be supplied with a separate supply of electrolyte. The location indicated at 29C has some advantage in its better accessibility but is capable of sampling only the central portion of the face 11A. This, however, can be at least in part cured by using a relatively large sensing electrode to average out the individual variations which a small sensing electrode would experience from spot to spot on the wheel. Further, such locating of the sensing electrode at a point following the cleaning electrode will also present some control and accuracy problems but which problems may be acceptable in the interest of locating the sensing electrode in a more acceptable place and where the supply of electrolyte may perhaps be more readily supplied to it than in the locations on the lower half of the wheel previously discussed.

FIG. 4 illustrates schematically an electrochemical abrasive belt grinder 10A wherein the grinding device is a belt having relatively nonconductive abrasive grain embedded in and projecting from an electrically conductive matrix as further shown in the above-mentioned U.S. patent to Bell, No. 3,162,588. In this particular embodiment, the cleaning electrode 22A is adjustably affixed to frame means 17A by an adjustable mounting 24A. The cleaning electrode 22A is spaced from the working face of the belt 30 to define a cleaning gap 23A therebetween and spaced from the workpiece W along the path of the working face of the belt. Said workpiece is mounted on a fixture 14A which is in turn supported by a table 16A and causes the workpiece to bear against the abrasive grain of the belt in the usual manner to define a working gap 34A corresponding to the working gap 34. Said table is preferably movable with respect to the frame 17A in a conventional manner for feeding purposes as is well known. Means, such as a backup roller 44 are preferably provided to assist in controlling the spacing of the cleaning electrode 22A from the belt.

Power supply and switching connections to the cleaning electrode 22A may be the same as discussed for the device of FIGS. 1 and 2, including the additional provision of a sensing electrode (not shown) corresponding to the sensing electrode 29 of FIGS. 1 and 2.

Further reference to FIG. 4 will indicate that the wheel 28 may, with appropriate modifications which will be obvious in view of the foregoing, also be the contact wheel of a contact wheel grinder. In such case the workpiece will be held thereagainst by any suitable means and the cleaning electrode 22A, as well as the sensing electrode 29 may assume any convenient position along the belt 30 on either side of said wheel 28.

Figure 10:
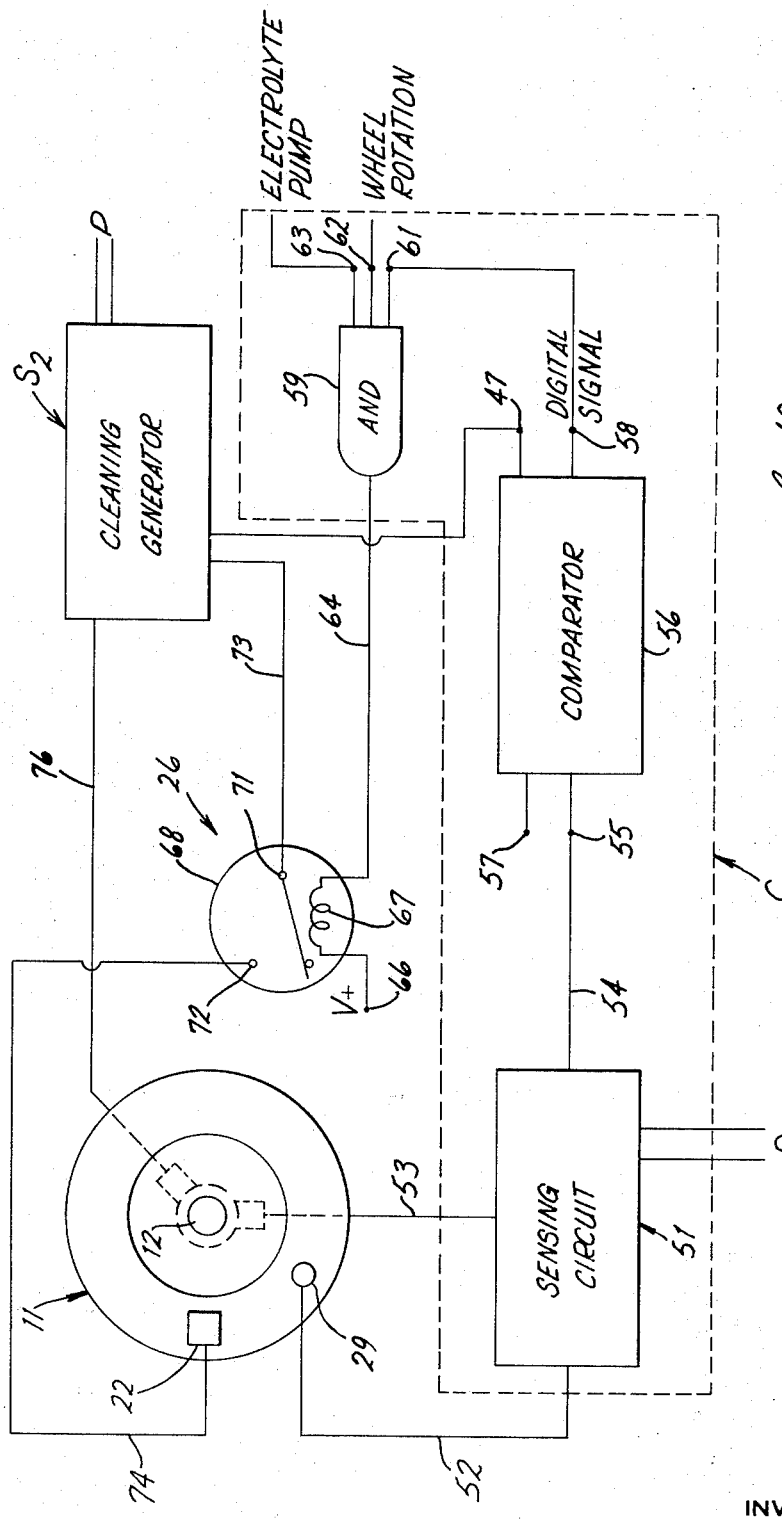
FIG. 10 is a schematic block diagram representing the system for analyzing the condition of the grinding device to determine if a cleaning operation is required and for controlling the cleaning operation in response to the analyzing information.

Referring now to FIG. 10, and the control circuit C for continuously monitoring the condition of the grinding device 11, a sensing circuit 51, discussed in more detail below, is connected in circuit with the grinding device 11 and the sensing electrode 29 through conductors 52 and 53 and is responsive to a change in resistance between the sensing electrode 29 and the grinding device 11. The output of the sensing circuit 51 is connected through a conductor 54 to one input terminal 55 of a two input terminal comparator 56. A reference potential source is connected to the second terminal 57 of the comparator 56. Thus, the analog output of the sensing circuit 51 is applied to the terminal 54 of the comparator 56, is compared with the reference potential applied to the terminal 57 to generate a signal, preferably digital, which appears at the output terminal 58 of the comparator 56.

An AND gate 59 is provided having three input terminals 61, 62 and 63. The input terminal 61 of the AND gate 59 is connected in circuit with the output terminal 58 so that the input 61 is enabled at each instant in time when an output appears on the output terminal 58 of the comparator 56. The input terminal 62 is enabled whenever the spindle of the grinding device 11 is in operation. The input terminal 63 is enabled whenever the pump (not shown) is in operation to supply electrolyte to the various ones of the nozzles 21, 35 and 36 discussed above. When all of the input terminals 61, 62 and 63 are enabled, an output signal appears on the conductor 64 which is sufficient in magnitude to oppose the voltage source applied at the terminal 66 to de-energize the winding 67 of a normally closed relay 68.

The relay 68 is connected so that the normally closed terminals 71 and 72 are connected, respectively, to one side of the cleaning generator or power source $S_2$ through conductor 73 and to the cleaning electrode 22 through conductor 74. The other side of the cleaning generator or power source $S_2$ is connected through conductor 76 to the spindle or shaft 12 of the grinding device 11. Thus, when the armature of the relay 68 moves upon a de-energization of the coil 67 to close the contacts 71 and 72, the cleaning generator $S_2$ will apply a potential across the cleaning gap 23 to perform a cleaning operation on the grinding device 11 described in detail below.

The comparator 56 may also supply, in addition to the digital output at 58, an analog output at 47 which is connected in circuit with the cleaning generator $S_2$ to control the intensity of the potential applied to the cleaning electrode 22. The intensity of the cleaning potential may vary over a desired range so that when the sensing circuit 51 detects a dirty condition on the grinding device 11, which requires an intense cleaning potential to remove same, the digital output at 58 will turn the AND gate 59 on to close the contacts 71 and 72 of the relay 68 and the analog output will be sufficiently high to cause an intense cleaning potential to be supplied to the cleaning electrode 22. The intensity of the cleaning potential will thereafter be regulated as a function of the condition of the grinding device 11 detected by the sensing electrode 29 and sensing circuit 51.

It is also possible for the cleaning generator $S_2$ to be of a constant intensity type so that the analog output at 47 can be omitted. As a result, and AND gate 59 will provide the sole means for controlling the relay 68 to regulate the period of time that cleaning potential is applied to the cleaning electrode 22. Still further, the digital output at 58 can be omitted and complete reliance placed on the analog output at 47 to control the intensity of the cleaning potential over a desired range including the zero value when no cleaning is required.

Figure 11:
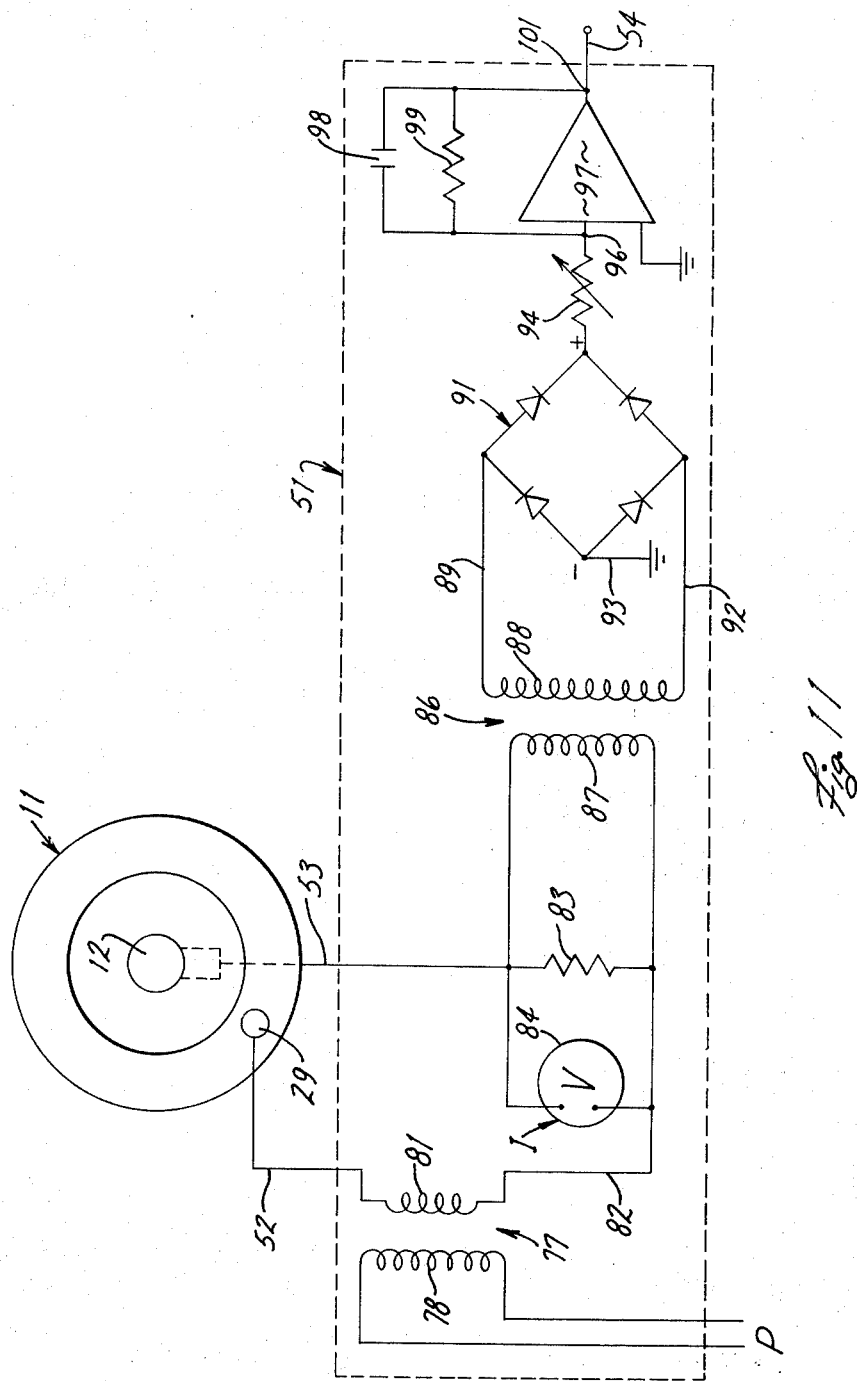
FIG. 11 is a schematic electrical diagram of an electrical circuit capable of analyzing the condition of the grinding device and producing a signal representative of the amount of buildup of waste material on the grinding device.

Turning now to FIG. 11 for details of a preferred sensing circuit 51, same comprises a transformer 77 wherein the primary winding 78 is connected in circuit with an alternating current power source P of standard frequency. The secondary winding 81 is connected through the conductor 52 to the sensing electrode 29. The opposite end of the secondary 81 is connected through a conductor 82 to one side of a resistor 83 with the opposite side of the resistor 83 being connected through the conductor 53 to the spindle or shaft 12 of the grinding device 11. Thus, the current from the power source P will be transmitted to the secondary winding 81 and thence through the resistor 83 and through the sensing gap 45 between the sensing electrode 29 and the grinding device 11. The indicator I, here a voltmeter 84, is connected in parallel with the resistor 84 to measure the voltage drop across the resistor 83.

A transformer 86 is connected so that its primary winding 87 is connected in parallel across the resistor 83. The secondary winding 88 is connected through conductors 89 and 92 to opposite sides of a full wave rectifier 91. The negative output side of the full wave rectifier 91 is grounded as at 93 and the positive output side thereof is connected through a variable calibrating resistance 94 to an input terminal 96 of an operational amplifier 97. A parallel capacitor 98 and resistor 99, whose function is to smooth out the output signal, is connected between the input terminal 96 and the output terminal 101 of the operational amplifier 97. The output signal from the operational amplifier 97 is an analog signal directly proportional but opposite in poparity to the input signal. For purposes of further discussion, the magnitude of the analog output signal from the operational amplifier 97 will be referred to in terms of absolute magnitude rather than in relation to zero. That is, and considering the difference between two negative signals, the more negative signal will be referred to as "higher" than the less negative signal. Similarly, the less negative signal will be referred to as "lower" than the more negative signal.

Operation

Although the operation of the device embodying the invention will be apparent to those persons skilled in the art, a summary of such description is now given for convenience.

The operation of the basic electrochemical grinding device, namely the grinding device 11, the workpiece W and the potential applying circuitry including the source $S_1$ all proceed as already well known and particularly as set forth in the above-mentioned patent to Keeleric.

If the grinding device 11 is clean as illustrated in FIG. 5, current will be permitted to pass between the sensing electrode 29 and the grinding device 11 so that a voltage drop across the resistor 83 measured by the voltmeter 84 will be indicative of a clean grinding device. More particularly, a relatively high voltage drop will appear across the resistor 83, which voltage drop will then be fed through the transformer 86 and full wave rectifier 91 to the input terminal 96 to the operational amplifier 97. Thus, the output at terminal 101 will be relatively high so that a high potential signal is applied through the conductor 54 and input terminal 55 (FIG. 10) to the comparator 56. In this particular embodiment, the reference potential applied at the input terminal 57 is preferably equal (or close within predetermined limits) to the signal applied to the input terminal 55 when the grinding device is clean. Therefore, the difference between the two signals, in this particular example, is zero (or less than a predetermined minimum) so that the comparator 56 will produce no output at the terminal 58. As a result, the input terminal 61 to the AND gate 59 will not be enabled. As a result, no output will appear on the line 64 so that the switch device 26 (FIGS. 1 and 2) or relay 68 (FIG. 10) will remain in the open position shown in FIG. 10 and the cleaning generator $S_2$ will be prevented from applying a potential to the cleaning electrode 22.

However, and after work has been performed upon a workpiece W, a buildup of waste material will occur so that the grinding device 11 will appear as generally indicated in FIG. 6. As a result, the resistance between the sensing electrode 29 and the grinding device 11 will be increased so that the current passing therebetween will be reduced. This reduction in current will also reduce the current flow through the resistor 83 thereby resulting in a reduction of the voltage detected by the volt meter 84. The reduction in voltage will be transmitted through the transformer 86 and the full wave rectifier 91 to the input terminal 96 of the operational amplifier 97. Since the input signal to the terminal 96 is reduced the output of the amplifier 97 will be reduced to reflect a signal which is indicative of a reduction in the current passing between the sensing electrode 29 and the grinding device 11. That is, the input to the terminal 55 of the comparator 56 will be decreased so that a difference between the signal at input terminal 55 and the signal at input terminal 57, greater than the predetermined minimum, will be detected and a signal will be generated at the output 58 so that the input terminal 61 to the AND gate 59 will be enabled. Since the spindle of the grinding device 11 and the electrolyte pump are both energized during a grinding operation, the input terminals 62 and 63 will be enabled. As a result of all three input terminals 61, 62 and 63 of the AND gate 59 being enabled, an output will appear on the conductor 64 which will oppose the potential applied at the terminal 66 to de-energize the coil 67 of the relay 68. As a result, the armature of the relay 68 will move to the normally closed position so that the potential from the cleaning generator $S_2$ will be applied through the now closed contacts 71 and 72 to the cleaning electrode 22 to perform a cleaning operation on the grinding device 11.

At the beginning of the appearance of each pulse 40 (FIG. 9) across the cleaning gap 23, there will be a full potential drop across the gap as indicated by the peaks 41. However, as soon as an appropriate zone of the cleaning gap becomes ionized and a spark is thereby generated across the gap, the voltage drop diminishes as indicated by the portions 42 of FIG. 9. The sparks are indicated at 32 in FIG. 7 and act to remove, possibly by vaporization and/or blasting, the waste material 31 above-mentioned.

Of course, the sparks will be of somewhat random nature but if the grinding device or wheel 11 is both rotated and oscillated with respect to the cleaning electrode in the same manner as is normal practice with respect to the workpiece, the cleaning electrode will act upon the entire working portion of the wheel in a substantially uniform manner and the waste material will be effectively removed. Where used with a belt (FIG. 4), or peripheral wheel, it may be preferable to reciprocate or oscillate the cleaning electrode across the abrasive surface or alternately the cleaning electrode may be of bar-shaped, or otherwise shaped and dimensioned, to extend without reciprocation at all times fully across the abrasive surface.

Since the conditions under which the cleaning electrode operates can be accurately preset or made subject to continuing automatic measurement, the action of said cleaning electrode will be uniform and essentially independent of the judgment of the operator.

While the cleaning electrode 22 is illustrated in FIGS. 1 and 2 as adjustably mounted on the fixed frame or base 17 and therefore adjustable toward and away from the wheel, it will be recognized that the cleaning electrode can be completely preset entirely independent of any locating and movement of the workpiece relative to the grinding device. In this event, it is feasible, if desired, to provide automatic means, such as the microswitch 25, for opening the circuit between the cleaning generator $S_2$ and the cleaning electrode 22 when the workpiece W is retracted.

In choosing the conditions under which the cleaning electrode is to operate, and assuming that the character, frequency and width of pulses applied to the cleaning electrode have already been chosen and designed into the apparatus, the factors for control by the set up personnel are the cleaning gap 23 and the voltage to be applied to the cleaning electrode and these factors, including adjustment of gap 23 to compensate for wheel wear, can be made automatic if desired.

Where the cleaning electrode is used solely for cleaning purposes, the cleaning gap 23 can vary from as little as will provide effective electrochemical action (such as, as little as 0.0002 inch) to as much as will remain essentially full of electrolyte, the same being derived from the film thereof carried on the surface of the grinding device (such as probably not over about 0.007 inch). Hence, in most instances the effective gap range is from about 0.0002 inch to about 0.007 inch.

The sensing gap 45 at the sensing electrode 29 should be arranged, and provide with a supplemental supply of electrolyte if necessary, so that it will simulate as competently as possible the conditions in the working gap 34 at the workpiece W. Where no sensing electrode is used and the cleaning electrode is used also for sensing purposes, it will then need to be arranged, instead of as above outlined, in contact with the abrasive grain of the grinding device in a manner generally similar to that described for the sensing electrode and provided with a separate electrolyte supply if necessary to simulate the conditions of the working gap 34.

Thus, for example, in a face wheel grinder, though here schematically illustrated by separate nozzles 35 and 36 as described above, it is often preferred to introduce the electrolyte at the center portion of the wheel to permit same to spread radially by centrifugal force and thereby provide a substantially uniform supply of electrolyte to all portions of the wheel face and consequently a substantially uniform supply of electrolyte to each and all of the workpieces, the cleaning electrode and the sensing electrode if the latter is used. However, in the case of a peripheral wheel or a belt grinder, supplemental supplies of electrolyte may be needed to accomplish this purpose.

It must be borne in mind that a spark passing between the cleaning electrode and the grinding device will erode at least a small amount of material from both the cleaning electrode and from the waste material on the grinding device, as well as from the grinding device after the waste material has been removed. Therefore, the sparking conditions associated with the cleaning electrode must be chosen to maximize the erosion of the waste material and to minimize the erosion of the electrode. Such control over a spark is already well known to the art and needs no detailed discussion here. Briefly, however, it may be said that the cleaning gap 23 will be made as small as possible but without effecting other than light contact at most between the cleaning electrode and the abrasive grain on the grinding device, with the voltage then being chosen in view of the existing resistance across gap 23 conditions to bring about the desired amount of sparking. Such voltage must of course be sufficient in view of a given resistance across said gap 23 to generate a spark across same while the upper limits of such voltage are as a function of the economics of the voltage source used. However, the pulse width, pulse frequency and duration of applications thereof to the wheel are critical because if the energy content on the sparks is too high, the sparks will pit the grinding device whereas if the total energy applied is too low, the grinding device will not be satisfactorily cleaned. It is therefore necessary to choose a voltage, pulse width and pulse frequency which will keep the grinding device clean and yet without pitting same. However, such control of voltage, pulse width and pulse frequencies, is adequately known in connection with grinding and machining by electric discharge techniques so that detailing thereof is unnecessary here.

Nevertheless, as one practical example of such pulse characteristics, attention is called to FIG. 8 wherein there is recorded the results of a successful operation with a metal bonded diamond wheel, six inches in diameter, rotating at 3500 r.p.m., and working against a workpiece of tungsten carbide. In such case, it was found effective to provide a pulse voltage of 78 volts, with a pulse width of 46 microseconds and a pulse frequency of 11.9 kilocycles per second. The curve shows the increasing conductive capacity of the wheel and working gap combination in response to progressive application of electrical energy to the cleaning electrode in bursts of 15 seconds duration.

It should be observed that the pulse width has a further limitation in addition to the energy content above referred to in that it is necessarily so related to the lineal speed of the grinding device that the pits produced by any given pulse will not have a length over a few times, as 2 or 3 times, their width. It is of particular importance that such pits be of length materially less than the corresponding dimension of the workpiece. This limitation is, however, likewise known in electric discharge machining as being necessary therein, particularly for precision work, and needs no detailed discussion here. The reference is again made to FIG. 8 for one satisfactory example of the procedure in question. It will be apparent of course that as the diameter or rotative velocity of the wheel increases, the pulse widths must be correspondingly shortened to maintain such pulse widths at such a value as to produce the small and relatively round craters above mentioned.

In some instances of practical operation, such as to avoid the danger of pitting of the wheel or to optimize electrochemical activity in the zone 34 between the workpiece W and the bond of the wheel 11, it may be more desirable to accept the presence of some waste material. For this purpose one may choose either a shorter pulse width or a lower repetition rate so that the cleaning operation is limited and the film of waste material is maintained at the thickness desired. While this thickness of permitted waste material will vary according to circumstances, as an illustrative example it may be stated that where a tungsten carbide workpiece is operating against a metal bonded diamond wheel and utilizing an electrolyte comprising an aqueous solution of a highly ionizable metallic salt (such as sodium nitrate), such desirable thickness can be of the order of 0.0002 inch. However, small plus or minus variations in such thickness of waste material may be acceptable and might not objectionably interfere with optimum operating functions of ECG.

In order for the system of FIG. 10 to operate satisfactorily, the input terminal 57 is preset to a desired operating range, namely in one instance taken for illustration, at approximately 190 amperes (FIG. 8) so that the signal received from output 54 of the sensing circuit 51 will be compared with the preset value on the input terminal 57. As a result, the cleaning electrode 22 will be energized to maintain the current at approximately 190 amperes. That is, as the current across the sensing gap 45 is reduced due to a build-up of waste material on the grinding device 11, the comparator 56 will produce a signal to cause the cleaning generator $S_2$ to apply a cleaning potential to the cleaning electrode 22 as set forth hereinabove. The more sophisticated control of FIGS. 12-14, discussed below, will operate to maintain the current at an optimum level, namely the top of the curve in FIG. 8 rather than a preset level on the sloped portion of the curve of FIG. 8 as set forth above with respect to FIG. 10.

The use of a separate cleaning electrode according to the invention also makes it possible to use with it an electrolyte different from that supplied to the workpiece W, if such is desired to promote effective cleaning. A similar or further independent supply may be provided for the sensing electrode if desired.

ALTERNATE EMBODIMENT (FIGS. 12-14)

Figure 12:
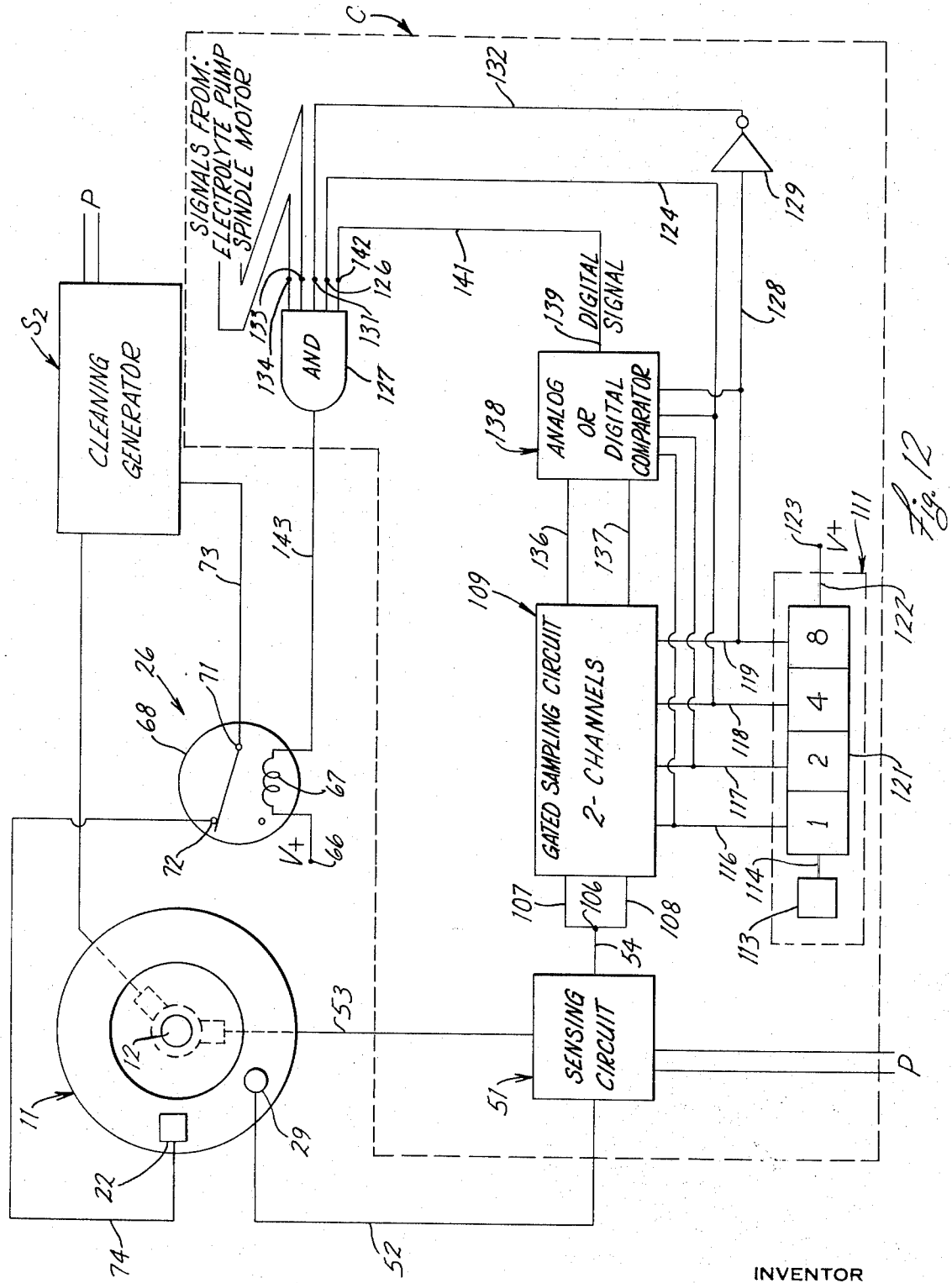
FIG. 12 is a schematic block diagram representing an alternate system for analyzing the condition of the grinding device to determine if a cleaning operation is required and circuitry responsive to the analyzed information for performing the cleaning operation.

A more sophisticated control circuit C is illustrated in FIG. 12 which is capable of analyzing whether a cleaning operation is required in the system shown in FIGS. 1-4 to maintain the current at the optimum level. If the grinding device 11 is relatively clean as shown in FIG. 5, the control circuit C is capable of detecting the clean condition on the grinding device 11 to prevent the cleaning generator $S_2$ from applying a potential to the cleaning electrode 22. On the other hand, if the control circuit C senses a build-up of waste material on the grinding device 11, appropriate circuitry will be initiated to cause a potential to be applied to the cleaning electrode 22. However, in this circuit, a periodic check of the condition of the grinding device 11 will be made to maintain the current at the optimum level rather than a continuous monitoring of the grinding device to maintain the current at the preset level as was set forth above. In other words, the system of FIGS. 12-14 will operate to maintain the current at the optimum level regardless of the starting point.

More specifically, the circuitry incorporating the cleaning generator $S_2$, the switching device 26, the cleaning electrode 22, the sensing electrode and the sensing circuit 51 is identical to the corresponding portions of the apparatus illustrated in FIG. 10 and a further detailed discussion thereof is believed unnecessary. Accordingly, the same reference numerals will be used to designate corresponding components of the system.

In this particular embodiment, the output 54 of the sensing circuit 51 is connected through a junction point 106 to two input lines 107 and 108 to a gated sampling circuit 109.

The gated sampling circuit 109 is responsive to a sequence of pulses generated by a timing section 111. The timing section 111 is responsive to timing pulses of a predetermined timed interval to control the functions to be performed by the gated sampling circuit 109 and the switching device 26. Such timing can be from any conventional timing device, such as an electronic clock 113 or a magnetic sensor (not shown) which is positioned in close association with the hub of the grinding device 11 as disclosed in my copending application Ser. No. 774,009, filed Nov. 7, 1968.

A synchronized pulse train is generated at the output terminals 116, 117, 118 and 119 of the timing section 111 and applied to the gated sampling circuit 109. The timing section 111 is supplied with pulses from the clock 113 to a conductor 114 connects the clock 113 to a counter 121 of any conventional type having a power input terminal 122 connected to any independent potential source 123. In this particular embodiment, four outputs are generated at the output terminals 116, 117, 118 and 119 and are energized according to the table illustrated in FIG. 4, the shaded bars indicating the "on" condition of the respective outputs.

The output conductor 118 of the timing section 111 is also connected through a conductor 124 to the intput terminal 126 of an AND gate 127. The output terminal 119 of the timing section 111 is likewise also connected through a conductor 128 to an inverter 129 and thence through a conductor 132 to the input terminal 131 of the AND gate 127. The input terminals 133 and 134 are connected, respectively, to the drive motor for the grinding device 11 and the pump for pumping the electrolyte to the various ones of the nozzles 21, 35 and 36. Thus, the input terminals 133 and 134 to the AND gate 127 are enabled whenever the driving motor for the grinding device 11 and the electrolyte pump are in operation. The input terminals 133 and 134 behave in the same manner as does the input terminals 62 and 63 to the AND gate 59 shown in FIG. 10.

The gated sampling circuit 109 is connected through a pair of conductors 136 and 137 to a comparator 138 which may be of either analog or digital type, but which is arranged to provide a digital output. The output conductors 116, 117, 118 and 119 of the timing section 111 are connected to the circuitry components described below in the comparator 138. The function performed by the analog or digital comparator 138 is to take the information received from the gated sampling circuit 109 and periodically, based on the timed signals from the timing section 111, determine whether a cleaning operation should be performed on the grinding device 11. If the conditions on the grinding device 11 require a cleaning operation, a signal will appear at the output terminal 139 of the comparator 138, which output is fed through a conductor 141 to the input terminal 142 of the AND gate 127. When all input terminals 126, 131, 133, 134 and 142 to the AND gate 127 are enabled, an output signal will appear on the conductor 143 to oppose the potential across the coil 67 of the relay 68 from source 66 so that the armature of the relay 68 will move to the condition shown in FIG. 12 to permit the application of a potential from the cleaning generator $S_2$ to the cleaning electrode 22. When one of the inputs to the AND gate 127 is not enabled, no signal will appear on the output conductor 143 so that the potential source 66 will energize the coil 67 of the relay 68 to move the armature to the opened position to prevent the application of a potential from the cleaning generator $S_2$ to the cleaning electrode 22.

Figure 13:
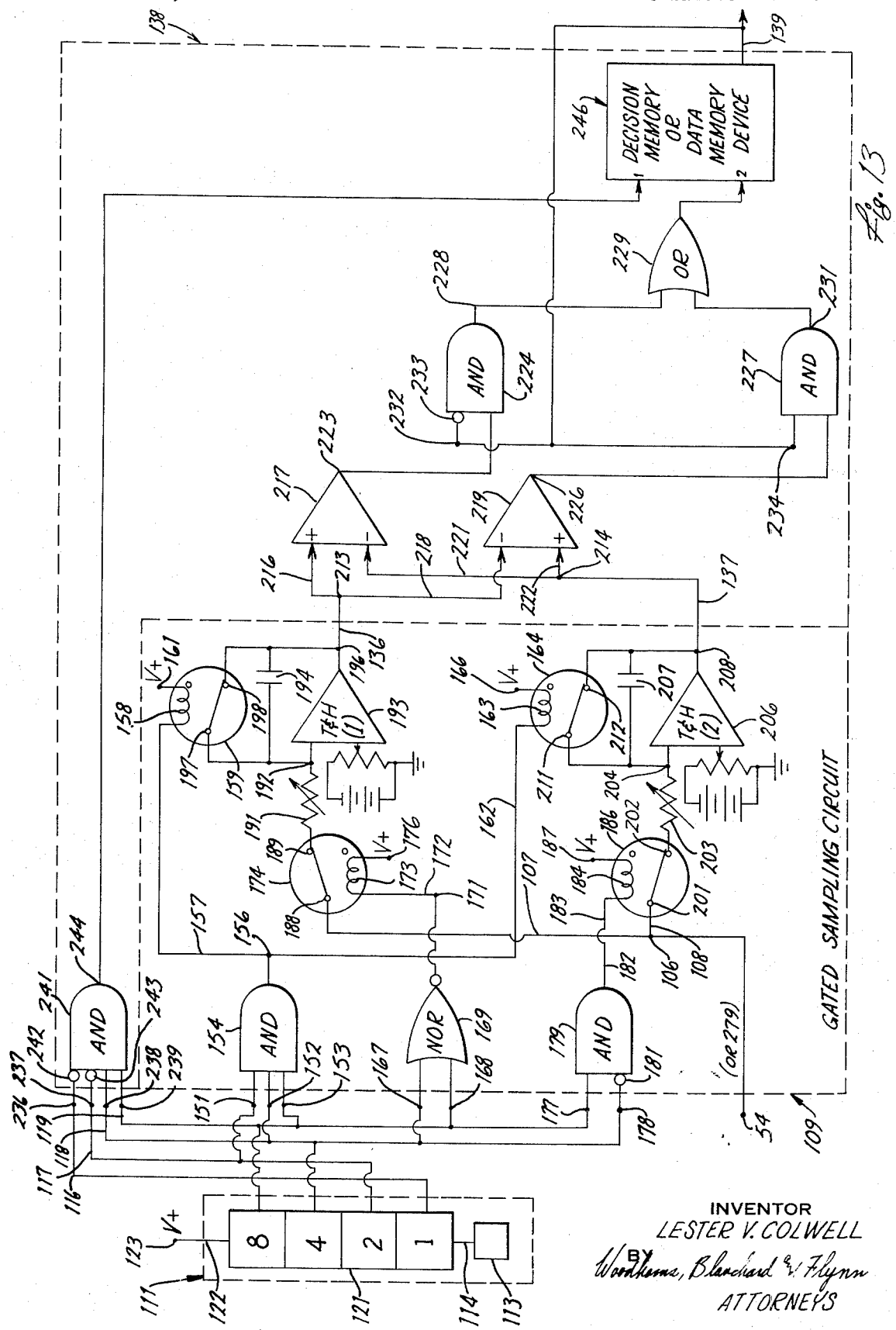
FIG. 13 is a schematic electrical diagram of the sampling circuit illustrated in FIG. 12.

FIG. 13 illustrates in more detail the circuitry of the gate sampling circuit 109 and the analog or digital comparator 138. Referring first to the circuitry of the gated sampling circuit 109, the input terminals 151, 152, and 153 of the AND gate 154 are connected, respectively, to the output terminals 117, 118 and 119 of the timing section 111. When all three of the input terminals 151, 152 and 153 are enabled, an output signal will appear at 156 of the AND gate 154. The output 156 is connected by a conductor 157 through a coil 158 of a normally closed relay 159 to oppose the potential applied to the terminal 161. Similarly, the output 156 is connected by a conductor 162 through a coil 163 of a normally closed relay 164 to oppose a potential applied to the terminal 166.

The input terminals 167 and 168 of a NOR gate 169 are connected, respectively, to the output conductors 118 and 119, respectively, of the timing section 111. When either one or both of the input terminals 167 and 168 are enabled, no output will appear at 171. However, when no signal is applied to the input terminals 167 and 168, an output signal will appear at 171. The output 171 of the NOR gate 169 is connected by a conductor 172 through a coil 173 of a normally closed relay 174 to oppose the potential applied to the terminal 176.

The input terminals 177 and 178 of an AND gate 179 are connected, respectively, to the output conductors 119 118 of the timing section 111. In this particular embodiment, the input terminal 178 is connected through an inverter 181 to the AND gate 179. When the input terminals 178 and 179 are both enabled, no output will appear at 182. However, when the input terminal 177 is enabled but the input terminal 178 is not enabled, an output signal will appear at 182. The output 182 of the AND gate 179 is connected by a conductor 183 through a coil 184 of a normally closed relay 186 to oppose the potential applied to the terminal 187.

The output terminal 54 of the sensing circuit 51 is connected to the junction point 106. The conductor 107 is connected to the terminal 188 of the relay 174. Since the relay 174 is normally closed, the armature thereof normally connects the terminal 188 to the terminal 189. The terminal 189 is connected through a variable calibrating resistance 191 to an input terminal 192 of an amplifier 193, which may be of any conventional type. A capacitor 194 is connected between the input terminal 192 and the output terminal 196 of the amplifier 193. The normally closed terminals 197 and 198 of the relay 159 are connected in parallel with the capacitor 194.

The conductor 108 connects the junction point 106 to a terminal 201 on the relay 186. In this particular embodiment, the armature of the relay 186 is normally closed to connect the terminal 201 to the terminal 202. The terminal 202 is connected through a variable calibrating resistance 203 to the input terminal 204 of an amplifier 206, which may be of any conventional type. A capacitor 207 is connected between the input terminal 204 and the output terminal 208 of the amplifier 206. In this particular embodiment, the normally closed terminals 211 and 212 of the relay 164 are connected in parallel across the capacitor 207.

Referring now to the comparator circuit 138, the conductor 136 connects the output 196 of the amplifier 193 to a junction point 213. The junction point 213 is connected through a conductor 216 to the "+" input terminal of the high gain differential amplifier 217. The junction point 213 is also connected through a conductor 218 to the "−" input terminal of the high gain differential amplifier 219. The conductor 137 connects the output 208 of the amplifier 206 to a junction point 214. The junction point 214 is connected through a conductor 221 to the "−" input terminal of the amplifier 217. The junction point 214 is also connected through a conductor 222 to the "+" input terminal of the amplifier 219. In this particular embodiment, the amplifiers 217 and 219 are very high gain differential amplifiers of the type which saturate very quickly when the potentials are according to the signs on the input terminals to produce an essentially on-off output in response to a variable input.

The output 223 of the amplifier 217 is connected to an input of an AND gate 224. The output 228 of the AND gate 224 is connected to an input of an OR gate 229. The input terminal 232 is connected through an inverter 233 to the AND gate 224 and is also connected to the output conductor 139 of a decision memory or data memory device 246, such as a D-type flip-flop circuit of any conventional type, for example a Series K202 flip-flop discussed on p. 53 of a publication by Digital Equipment Corporation, Maynard, Mass. entitled "Digital Industrial Handbook" (1968 ed.). The D-type flip-flop has the characteristics of transferring the signal at input 2 to the output terminal 139 when input 1 is enabled. That is, if input 2 is HI when input 1 is enabled, the output 139 will also be HI. If input 2 is LO when input 1 is enabled, the output 139 will also be LO. The output 226 of the amplifier 219 is connected to an input of an AND gate 227. The output 231 of the AND gate 227 is connected to another input of the OR gate 229. The remaining input terminal 234 of the AND gate 227 is connected to the output conductor 139 of the data memory device 246.

The input terminals 236, 237, 238 and 239 of an AND gate 241 are connected, respectively, to the output conductors 116, 117, 118, and 119 of the timing section 111. In this particular embodiment, the input terminal 236 is connected through an inverter 242 to the AND gate 241. Similarly, the input terminal 237 is connected through an inverter 243 to the AND gate 241. The output terminal 244 of the AND gate 241 is connected to input 1 of a D-type flip-flop circuit 246. The output 247 of the OR gate 229 is connected to input 2 of the flip-flop circuit 246.

OPERATION (FIGS. 12–14)

Figure 14:
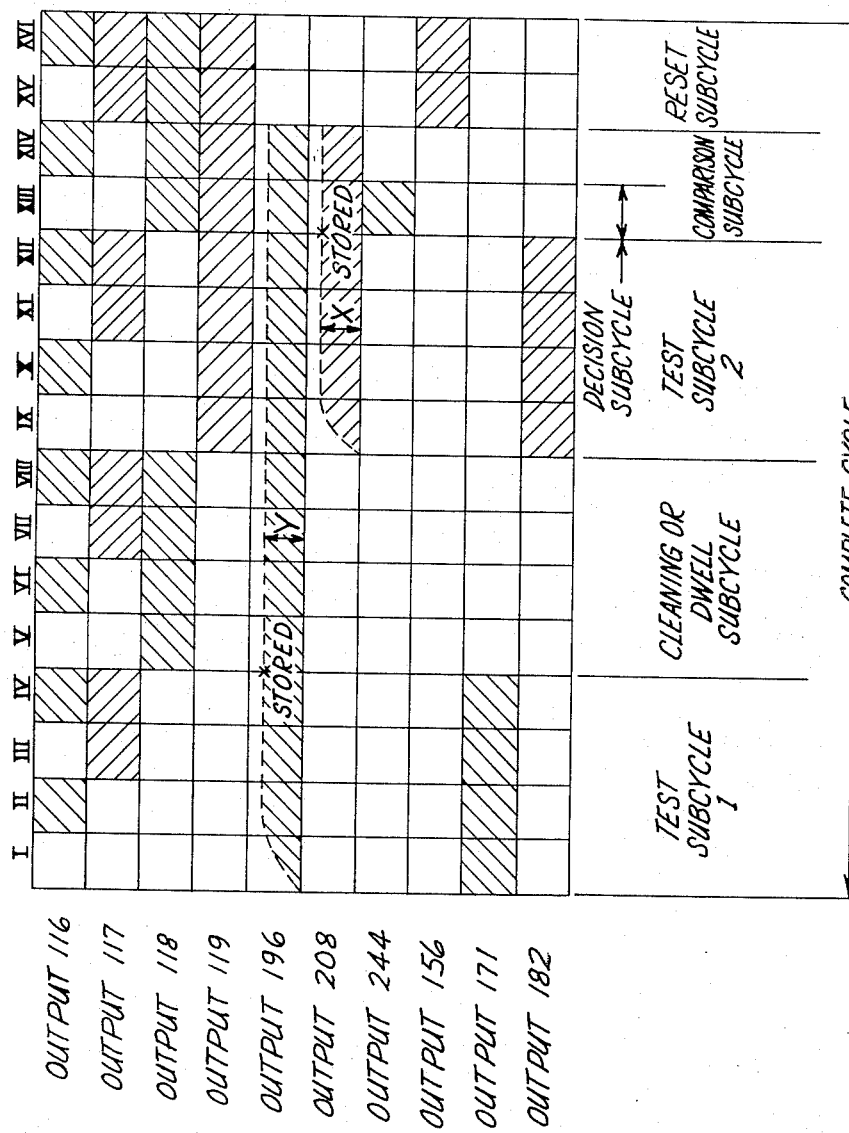
FIG. 14 is a chart illustrating the various functions which occur at predetermined time intervals.

Although the operation of the circuitry of FIGS. 12–14 described above will be understood from the foregoing description by skilled persons, a summary of such description is now given for convenience.

Again, the operation of the basic electrochemical grinding machine, namely the grinding device 11, the workpiece W and the potential applying circuitry including the source $S_1$, all proceed as already well known and as described above. Once the clock 113 is activated, pulsed signals will be applied to the input terminal 114 of the counter 121 so that a pulse train is produced in varying patterns on each of the output terminals 116, 117, 118 and 119 of the timing section 111. FIG. 14 illustrates the intervals during which the output terminals 116, 117, 118 and 119 are respectively turned on and off. For example, the conductor 116 is turned off during time interval I, turned on during time interval II, turned off during time interval III and continuing alternately on and off through the remaining time intervals illustrated in FIG. 14. Output terminal 117 is turned off for two time intervals I and II and then turned on for two time intervals III and IV and then turned off again for two time intervals V and VI and so on. Output terminal 118 is turned off for four time intervals I–IV and then turned on for four time intervals V–VIII and is then turned off again for four time intervals IX–XII and is then turned on again during four time intervals XIII–XVI. Output terminal 119 is turned off for eight time intervals I–VIII and is then turned on for eight time intervals IX–XVI. Once time interval XVI is reached, the counter 121 is automatically reset to start again at time interval I.

The foregoing described pulse train is applied to the inputs of the AND gates 154, 179, and 241 and NOR gate 169 as above described.

A comparison of FIG. 14 with the inputs to the AND gate 154 will indicate that AND gate 154 will remain in an off condition through time intervals I–XIV and be turned on only during time intervals XV and XVI. NOR gate 169 will be turned on during time intervals I–IV and then remain in the off condition through time intervals V–XVI. AND gate 179 will remain in the off condition through time intervals I–VIII and will be turned on during time intervals IX–XII and then be turned off again during time intervals XIII–XVI.

For further convenient reference, these intervals can be grouped as follows:

Test Subcycle 1—Intervals I–IV
Cleaning or Dwell Subcycle—Intervals V–VIII
Test Subcycle 2—Intervals IX–XII
Comparison Subcycle—Intervals XIII–XIV
Decision Subcycle—Intervals XIII
Reset Subcycle—Intervals XV–XVI The following is a brief summary of the operation of the apparatus.

LO SIGNAL AT 139

During test subcycle 1, interval I–IV, capacitor 194 is charged to a level indicative of the condition of the grinding device 11. If during the cleaning or dwell subcycle, intervals V–VIII, no cleaning is performed, waste material accumulates, then the potential on conductor 54 will decrease to charge the capacitor 207, to a level lower than the charge stored on the capacitor 194, during test subcycle 2, intervals IX–XII. As a result, and recognizing that a LO signal exists at 139, the high gain amplifier 217 is turned on to place a HI signal at input 2 of the data memory device 246 and a HI signal at 139 beginning at the decision interval XIII to set up a cleaning operation during the next intervals V–VIII for cleaning or dwell.

If, on the other hand, during the cleaning or dwell subcycle, intervals V–VIII the current to the grinding device 11 is improved even though no cleaning operation was performed due to, for example randomly occurring sparking in the working gap 34 which removes waste material from the grinding device, then the potential on conductor 54 will increase to charge the capacitor 207 to a level higher than the charge stored on the capacitor 194 during test subcycle 2, intervals IX–XII. As a result, the high gain amplifier 219 is turned on to place a HI signal at 226. However, this HI signal will be blocked by the AND gate 227, due to the LO signal at output 139 and input terminal 234. Thus, no cleaning operation will be set up during the next intervals V–VIII for cleaning or dwell.

HI SIGNAL AT 139

If, during the cleaning or dwell subcycle, intervals V–VIII, the condition of the grinding device 11 is rendered cleaner by the cleaning operation, then the potential on conductor 54 will increase to charge the capacitor 207 to a level higher than the charge stored on the capacitor 194 during test subcycle 2, intervals IX–XII. As a result, the high gain amplifier 219 is turned on to produce a HI signal at 226 which combined with the HI from 139 enables the AND gate 224 so that at interval XIII a HI signal will be applied to 139 to set up a cleaning operation during the next succeeding interval V–VIII. The HI signal at 139 will remain causing the current (FIG. 8) to increase (left to right on the curve) every time a cleaning operation is performed until the optimum level is determined after which time further cleaning will result in a decrease in the current. As a result, the potential on the conductor 54 will decrease to charge the capacitor 207 to a level lower than the charge stored on the capacitor 194. Thus, and recognizing that a HI exists at 139, the high gain amplifier 217 is turned on to place a HI signal at 223, however, the HI signal is blocked by the AND gate 224 due to the HI being inverted by the inverter 233 to prevent an enabling of same. As a result, the HI at 139 is changed to a LO at the decision subcycle XIII to set up a non-cleaning operation during the next succeeding cleaning or dwell subcycle. Continued operation will cause waste material to build up but this build-up will result in an increase in the current (right to left on the curve of FIG. 8) or a condition analogous to a cleaner grinding device 11. Accordingly, the apparatus will remain unchanged as set forth above.

If, however, during the cleaning or dwell subcycle the condition of the grinding device is rendered worse or some condition occurs which reflects a worse condition of the grinding device 11 even though a cleaning operation was performed, then the potential on conductor 54 will decrease to charge the capacitor 207 to a level lower than the charge stored on the capacitor 194 during test subcycle 2, intervals IX–XII. As a result, the high gain amplifier 217 is turned on to produce a HI signal at 223 which combined with the HI from 139 is inverted to a LO signal by the AND gate 224 so that at interval XIII a LO signal will be applied to 139 to set up a non-cleaning operation during the next succeeding interval V–VIII. If the operating point is to the left of the optimum level, then during the next complete cycle a HI will be produced at 139 as set forth above. However, if the operating point is to the right of the optimum level, then and as stated in the previous paragraph, the grinding device 11 will be permitted to have a build-up of waste material until the current is restricted enough to initiate another cleaning operation.

The following discussion is a more detailed explanation of the operation of the FIGS. 12–14 embodiment under operating conditions.

TEST SUBCYCLE 1—INTERVALS I–IV

Assuming that the operator has initiated a grinding operation on a workpiece W and that current is flowing between the sensing electrode 29 and the grinding device 11, an output signal will appear on the output 54 of the sensing circuit 51 as described above. For purposes of discussion, it will be assumed that the grinding device is clean and that a maxmum current signal will flow through the resistor 83 so that a high input signal will be transmitted to the input terminal 96 (FIG. 11) of the operational amplifier 97. It will be further assumed that from a previous operation with a clean electrode the system was left with a LO output signal applied by the data memory device 246 of the comparator 138 to the output terminal 139. A high input signal to the input terminal 96 of the operational amplifier 97 will result in a high analog output signal at the output 101 (line 54) which is applied to the conductor 54 and then transmitted to the junction point 106 in the gated sampling circuit 109.

At time interval I, there is no signal output at output terminal 156 of the AND gate 154 and no output signal at the output terminal 182 of the AND gate 179. As a result, the potential source applied to the terminals 161, 166 and 187 will effect an energization of the relays 159, 164 and 186, respectively, to move the armatures thereof from the normally closed position to the open position. Thus, a signal applied to the junction point 106 will not pass between the contacts 201 and 202 of the relay 186. However, since, at time interval I, a HI output signal will appear at 171 to oppose the potential source applied to the terminal 176 to de-energize the coil 173 of the relay 174. As a result, the armature will connect the terminal 188 to the terminal 189 to cause the high analog signal at the junction point 106 to be transmitted through the variable calibrating resistor 191 to the input terminal 192 of the amplifier 193. As a result, the capacitor 194 will charge to a level representative of the signal applied to the junction point 106 which, in turn, is representative of the condition of the grinding device 11, namely a relatively high value following from a clean electrode.

CLEANING OR DWELL SUBCYCLE—INTERVALS V–VIII

Nothing more happens until time interval V whereat the output terminal 171 of the NOR gate 169 will change to a LO output signal so that the potential source applied to the terminal 176 will again energize the coil 173 of the relay 174 to open the connection between the terminals 188 and 189 to discontinue a charging of the capacitor 194. As a result, the charge stored on the capacitor 194 will be representative of the condition of the grinding device 11 during the time intervals I through IV. The rate at which the capacitor 194 is charged is controlled by the variable calibrating resistor 192. It is preferable that the capacitor 194 charge at a rate which will permit it to become charged during the time intervals I through IV to a level appropriate of the condition of the wheel. The potential stored on the capacitor 194 is applied through the conductor 136 to the junction point 213 and thence through the conductors 216 and 218, respectively, to the "+" and "−" input terminals of the high gain amplifiers 217 and 219.

Simultaneously at time interval V, and referring to FIG. 12, the above-mentioned LO output signal from the comparator 138 will prevent an enabling of the AND gate 127. As a result, a LO output signal will appear on the conductor 143 so that the potential applied to the terminal 66 will continue to energize the coil 67 of he relay 68 to prevent an application of potential from the cleaning generator $S_2$ to the cleaning electrode 22.

TEST SUBCYCLE 2—INTERVALS IX–XII

This condition continues until time interval IX at which time line 119 goes HI and the output terminal 182 of the AND gate 179 will change to a HI output signal to oppose the potential applied to the terminal 187 to de-energize the coil 184 of the relay 186. As a result, the armature will connect the terminals 201 and 202 so that the signal applied to the junction point 106 by the sensing circuit $S_1$ will be transmitted through the variable calibrated resistance 203 to the input terminal 204 of the amplifier 206. As a result, the capacitor 207 will charge to a level indicative of the signal appearing at the junction point 106 which, in turn, is representative of the condition of the grinding device 11. Since, in this particular example, it is assumed that an electrochemical grinding operation is being performed on a workpiece W, it will be assumed that there will be a waste material build-up on the grinding device 11. As a result, the current passing between the sensing electrode 29 and the grinding device 11 will be reduced from that of periods I–IV so that the potential drop across the resistor 83 (FIG. 11) will be reduced from that of periods I–IV. As a result, the signal to the input terminal 96 of the operational amplifier 97 will also be reduced. The output 101 from the operational amplifier 97 will decrease so that a relatively low signal will be applied to the junction point 106, in comparison to the signal applied to the junction point 106 during the time intervals I through IV, so that a lower potential will be applied to the capacitor 207.

COMPARISON SUBCYCLE AND DECISION SUBCYCLE—INTERVALS XIII–XIV

Nothing further will happen until time interval XIII at which time the output signal 182 of the AND gate 179 will change to a LO signal which will then permit the potential applied to the terminal 187 to energize the coil 184 of the relay 186 to open the armature between the contact 201 and 202. As a result, the relatively lower charge stored on the capacitor 207 will be representative of the somewhat dirtier condition of the grinding device 11 in intervals IX–XII as compared to intervals I–IV. The charge on the capacitor 207 will be applied through the conductor 137 to the junction point 214 and thence through the conductors 221 and 222 to the "−" and "+" terminals to the high gain amplifiers 217 and 219, respectively.

Since the higher potential is on capacitor 194, the potentials stored on the capacitors 194 and 207 are applied to the input terminals of the high gain amplifier 217 in the correct sense, that is, a higher potential being applied to the "+" input terminal than at the "−" input terminal, the high gain amplifier 217 will be turned on so that a HI output signal will appear at the output 223 and applied to one of the two input terminals to the AND gate 224. Simultaneously therewith, line 139 being LO, the input terminal 234 to the AND gate 224 will be enabled so that a HI output signal will appear at 228 and transmitted to one of the inputs of the OR gate 229 and produce a HI at input 2 of the data memory device 246. Simultaneously therewith (lines 116 and 117 being LO and lines 118 and 119 being HI) a HI output signal will appear at 244 of the AND gate 241 so that a HI input signal will be applied to the input 1 of the data memory device 246. Thus, the HI output signal applied to the input 2 of the data memory device 246 will be transmitted to the output 139 thereof to change the signal thereon from a LO to a HI signal. The HI output signal at the output 139 will remain HI until changed.

RESET SUBCYCLE—INTERVALS XV–XVI

At time intervals XV and XVI a HI output signal will appear at 156 to de-energize the coils 158 and 163 of the relays 159 and 164, respectively. As a result, the armatures of the relays 159 and 164 will move to the normally closed position to discharge the capacitors 194 and 207.

At time interval XVI, the counter 121 is reset to start at time interval I again and the above discussed sequence of events will repeat, but the HI condition at output 139 remains unchanged.

SECOND CYCLE
TEST SUBCYCLE 1—INTERVALS I–IV

At a second time interval I, the signal at 156 will change to a LO so that the contacts in the relays 159 and 164 will again open to permit a charging of the capacitors 194 and 207. Simultaneously therewith, a HI output signal will appear at 171 to oppose the potential applied to the input terminal 176 so that the coil 173 of the relay 174 will be de-energized. As a result, the signal applied to the junction point 106 by the sensing circuit 51 will pass through the relay 174, the variable calibrating resistance 191 to the input terminal 192 of the amplifier 193.

CLEANING OR DWELL SUBCYCLE—INTERVALS V–VIII

At time interval V, the relay 174 will open to prevent a continued charging of the capacitor 194 and the capacitor 194 will remain charged at a value indicative of the condition of the grinding device 11, same being relatively low due to gathering waste products on the electrode. The relatively low signal stored on the capacitor 194 will be transmitted through the conductor 136 to junction point 213, thence through conductors 216 and 218 to the "+" and "−" input terminals to the high gain amplifiers 217 and 219, respectively.

Simultaneously therewith at time interval V, and referring to FIG. 12, the output conductor 118 of the timing section 111 is HI so that the input terminal 126 to the AND gate 127 is enabled. The output terminal 119 of the timing section 111 is LO but the LO is changed to a HI by the invertor 129 which HI signal is applied through the conductor 132 to enable the input terminal 131 of the AND gate 127. Since the output signal at 139 of the comparator 138 is now HI, the input terminals to the AND gate 127 are enabled so that the signal on the conductor 143 will be changed to a HI signal to oppose the potential applied to the terminal 66 resulting in a de-energization of the coil 67 of the relay 68 to cause the armature to connect the contacts 71 and 72 to permit a potential to be applied through the now closed contacts of the relay 68 to the cleaning electrode 22 to permit a cleaning operation to be performed on the grinding device 11. The cleaning operation will continue until time interval IX when the signals on the output terminals 118 and 119 from the timing section 111 are changed to disenable the AND gate 127.

TEST SUBCYCLE 2—INTERVALS IX–XII

At time interval IX a HI output signal will appear at 182 to oppose the potential applied at terminal 187 to de-energize the coil 184 of the relay 186. As a result, the armature of the relay 186 will close to connect the contacts 201 and 202 to permit the signal applied at the junction point 106 by the sensing circuit 51 to be applied to the input terminal 204 of the amplifier 206. Since a cleaning operation has just been performed on the grinding device 11, and assuming it to have been effective to permit more current to pass between the sensing electrode 29 and the grinding device 11, the potential drop across the resistor 83 (FIG. 11) will increase so that a higher input signal will appear at 96 to the operational amplifier 97. Therefore, the output 54 from the sensing circuit 51 will be a higher analog signal which is applied to the junction point 106 and thence to the input terminal 204 of the amplified 206. As a result, the capacitor 207 is charged to this higher signal value during the time interval IX–XII.

COMPARISON AND DECISION SUBCYCLES INTERVALS XIII–XIV

At time interval XIII, the relay 186 will open to prevent a continued charging of the capacitor 207. However, and simultaneously therewith, the higher potential signal stored on the capacitor 207 is transmitted through the conductor 137 to the junction point 214, thence to the conductors 221 and 222 to the "−" and "+" input terminals to the high gain amplifiers 217 and 219, respectively. Since, in this case, the potentials are applied in the correct manner to the high gain amplifier 219, a HI output signal will appear at 226 of amplifier 219 and transmitted to one of the input terminals of the AND gate 227. Since the output conductor 139 of the data memory device is HI at time interval VIII the ouput signal at 231 will be HI so that a HI signal is applied to input 2 of the flip-flop circuit 246.

At time interval XIII, a HI output signal will appear at 244 from the AND gate 241 to transmit the HI input signal at input 2 of the data memory device 246 to the output 139 thereof. As a result, the cleaning operation will be repeated during the next appearance of time intervals V–VIII.

INTERVALS XV–XVI

Nothing further happens until time intervals XV and XVI appear at which time a HI output signal appears at 156 to deenergize the coils 158 and 163 of the relays 159 and 164 to close the contacts thereof to discharge the capacitors 194 and 207.

ALTERNATE SUBSEQUENT CYCLE

If, however, the cleaning operation above mentioned resulted in excessive removal of waste material the potential on capacitor 194 would be higher resulting in a HI output at 223 and a LO output at 226. Thus, with 139 HI, only a LO will appear at input 2 of the data memory device 246 and the cleaning operation is cancelled for the next cycle.

Following the excessive cleaning, subsequent loading of the grinding device 11 will improve conditions up to a critical thickness. Prior to this point, the charge on capacitor 207 will always be the higher but the fact that 139 is LO prevents cleaning and retains the improved condition of the grinding device.

The above process for cleaning the grinding device 11 will continue to maintain the waste material build-up thereon at an optimum.

ALTERNATE SENSING CIRCUIT (FIG. 15)

The sensing circuit 251 illustrated in FIG. 15 is capable of combining the detection of the condition of the grinding device 11 and the condition of the electrolyte distributed to the working gap 34 between the workpiece W and the grinding device 11. The sensing circuit portion 51A of the sensing circuit 251 is identical to the sensing circuit 51 set forth in FIG. 11. Accordingly, no further detailing is believed necessary. However, for purposes of discussion, the component parts of the sensing circuit 51 will be referred to by the same reference numerals designating corresponding components of the sensing circuit 51 but with the suffix "A" added thereto. As stated above, the output appearing at 101A will be proportional to the signal applied to the input 96A of the operational amplifier 97A.

The conductivity sensing circuit 252 is essentially identical to the circuit 51A except that the grinding device 11 is replaced with a conductivity cell 253. That is, a transformer 254 is provided so that its primary winding 256 is connected to the source P. The secondary winding 257 is connected at one end to the conductivity cell 253 and is connected at the other end through a resistor 258 to the opposite side of the conductivity cell 253. A volt meter 259 is connected in parallel across the resistor 258.

In this particular embodiment, the electrolyte is permitted to flow through the conductivity cell 203 between a pair of plates 261 and 262 so that the conductivity of the electrolytes can be measured. If the quality of the electrolyte is low, the amount of electrical current which can pass therethrough will also be low. On the other hand, if the quality of the electrolyte is high, the amount of current which can pass therethrough will also be high. The quality of the electrolyte will be measured by the voltage drop across the resistor 258.

A transformer 263 is provided so that its primary winding 264 is connected in parallel across the resistor 258. The secondary winding 266 is connected to a full wave rectifier 267 which rectifies the alternating signal into a D.C. signal which appears at the positive output terminal 268 thereof. The output appearing at 268 will be then transmitted through a resistor 269 to the input terminal 271 of an operational amplifier 272. A variable resistor 273 is conected between the input terminal 271 and the output terminal 274 of the operational amplifier 272.

The output 101A from the sensing circuit 51A and the output 274 from the conductivity sensing circuit 252 are applied to the input terminals 276 and 277, respectively, of a differential amplifier 278. The output signal appearing at the output terminal 279 of the differential amplifier 278 will represent a combination of (1) the condition of the grinding device 11 and (2) the conductivity of the electrolyte.

In operation, the sensing circuit 251 may be substituted for the sensing circuit 51 illustrated in FIG. 12. Accordingly, the signals appearing at the output terminal 279 will be applied to the junction point 106 of the gated sampling circuit 109. The operation of the circuit will be identical to that described above with respect to FIGS. 12 through 14. Accordingly, no further detailing is believed necessary.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an electrochemical grinding machine having a driving unit driving a grinding device comprising abrasive grains of substantially non-electrically conductive nature embedded in and protruding from an electrically conductive matrix, said grinding device having a working face positioned at least in close proximity to a workpiece, means for supplying electrolyte to a zone between said grinding device and said workpiece and means for supplying a potential between said grinding device and said workpiece for electrochemical grinding, a device for removing waste material from the grinding device comprising:
an energy source;
a cleaning electrode and cleaning electrode energizing means including a switch for connecting said cleaning electrode to said energy source, said cleaning electrode being spaced from the matrix of said grinding device to define a cleaning gap therebetween, said cleaning electrode being spaced from said workpiece along the path of said working face of said grinding device;
sensing means for sensing the level of waste material on the grinding device, said sensing means including circuit means for measuring the resistance across an electrolytic gap bounded on one side by the working face of the grinding device and generating output signals representative thereof, as a measure of the existing waste material level on the working face of said grinding device; and
control circuit means responsive to said sensing circuit means for maintaining a useful level of waste material on said working face, said control circuit means including comparator circuit means responsive to first and second input signals corresponding to waste material levels on the working face of the grinding device for providing a cleaning signal when the amount of waste material on the working face exceeds a preselected level, at least said second signal being one of said output signals of said sensing means, said first signal being a pre-existing signal, said cleaning electrode energizing means including AND function means responsive to coincidence of a cleaning signal and electrochemical grinding of said workpiece by said grinding device for activating said switch for a time interval sufficient to remove an increment of waste material from said grinding device while leaving a useful level of waste material on said grinding device working face;
whereby said energy source generates a potential across said cleaning gap effective to reduce the waste material on said grinding device to a selected useful level.

2. The device in claim 1 wherein said energy source generates a series of pulses of a pulse width which is so related to the lineal speed of the grinding device that a crater produced in said waste material by a single pulse from said energy source will be of length not appreciably more than three times its width.

3. The device in claim 1 in which said control circuit means includes means automatically de-energizing said cleaning electrode upon retraction of said workpiece from the grinding device.

4. The device of claim 1 in which said sensing means includes a sensing electrode spaced from said working face by said electrolytic gap and an A.C. electrical source, said sensing circuit means including voltage dropping means in series loop with said sensing electrode, said grinding device and said electrical source for providing a voltage drop, rectifier means connected across said voltage dropping means for producing said output signals from said voltage drop, said sensing electrode being spaced from said workpiece and cleaning electrode.

5. The device of claim 4 wherein said cleaning electrode and sensing electrode are provided with a supplemental source of electrolyte.

6. The device defined in claim 4 wherein said sensing electrode is positioned adjacent the portion of the grinding device where same runs from the workpiece to the cleaning electrode.

7. The device defined in claim 4 wherein said grinding device is a wheel and said sensing electrode is provided with an independent source of electrolyte and is positioned closely adjacent the workpiece, and wherein means are provided to effect relative oscillatory movement between the sensing electrode and the working area of the grinding device simultaneously with corresponding movement between the workpiece and the working area of the grinding device.

8. The device defined in claim 4 wherein said sensing electrode is provided with independent source of electrolyte.

9. The device defined in claim 4 wherein said sensing electrode is positioned closely adjacent said cleaning electrode and means are provided effecting relative oscillatory movement between the sensing electrode and said grinding device simultaneously with corresponding movement between the cleaning electrode and the grinding device.

10. The device of claim 4 wherein said sensing electrode is provided with an independent source of electrolyte and same is controllable independently of the electrolyte provided to the workpiece.

11. In an electrochemical grinding machine having a grinding unit driving a grinding device for grinding a workpiece, the improvement comprising:
an energy source;
a cleaning electrode connectable to said energy source and positioned in spaced relation to said grinding device to define a cleaning gap therebetween across which cleaning current can flow, said cleaning electrode being spaced from said workpiece along the path of the working face of said grinding device;
a sensing electrode positioned in spaced relation to said working face of said grinding device to define a sensing gap therebetween;
sensing circuitry means including an electrical source connected to said grinding device and said sensing electrode for causing sensing current flow across said sensing gap independent of cleaning current flow, said sensing circuitry means further including output means connected to said sensing electrode and responsive to sensing current flow therethrough for providing an output signal which varies with the amount of waste material on said working face during an operation of said machine; and
discriminating means connected to said sensing circuitry means and responsive to said output signal for determining when waste material has accumulated on the grinding device beyond a desired level and including a comparator circuit and switch means connected to the comparator circuit and actuable thereby for periodically connecting said energy source to said cleaning electrode to reduce the waste material to said desired level.

12. The device of claim 11 including means for sensing the conductivity of electrolyte;
further sensing circuitry means operatively connected to said electrolyte conductivity sensing means for detecting changes in the conductivity of said electrolyte; and
means connected to and responsive to the output of said first mentioned sensing circuitry means and said further sensing circuitry means and interposed between said first mentioned sensing circuitry means and said discriminating means for causing said discriminating means to be responsive to both the condition of said working face and the condition of said electrolyte in controlling the duration of the application of said energy source to said cleaning electrode.

13. The device of claim 11, wherein said sensing circuitry means provides a continuous output signal, said discriminating means includes a standard reference signal means for providing a preselectable reference signal corresponding to said desired level of waste material on the grinding device, said comparator circuit being connected with said standard means and said sensing circuitry means for comparing the output signal of said sensing circuitry means with said reference signal and thereafter controlling the duration of the application of said energy source to said cleaning electrode as a function of said comparison.

14. The device of claim 13 in which said sensing current increases to a peak value and then decreases from said peak value as the working face of said grinding device is rendered increasingly more clean, wherein said reference signal corresponds to a selected level of said sensing current below said peak value and to a condition of the working face of said grinding device less clean than required to obtain said peak current value, the duration of switch means actuation being a time interval sufficient to cause said current to rise to said selected level, said comparator circuit thereby reenergizing said cleaning electrode periodically to maintain said current near said selected level and hence at a substantially fixed difference from said peak value during the ongoing operation of said grinding wheel on said workpiece.

15. The device of claim 11, wherein said sensing circuitry means provides an output signal related to the resistance of the sensing gap and said discriminating means includes sampling means for sampling and remembering the value of a first output signal from said sensing circuitry means, said sampling and remembering being carried out prior to a predetermined point in time during a first cycle of operation;
 timing means connected to said sampling means for signaling said point in time and thereupon timing an interval for switching of said energy source to said cleaning electrode;
 means connecting said timing means to said comparator circuit for causing same during said first cycle of operation and after said interval to compare a second output signal from said sensing circuitry means with said remembered first signal and to issue a further signal indicating which of said first and second signals is greater; and
 means responsive to said further signal for determining whether said energy source will or will not be switched to said cleaning electrode during a next cycle of operation.

16. The device of claim 15 wherein said discriminating means includes a clock source, a digital counter actuated by said clock source and having a plurality of parallel output terminals, a plurality of logic gates having output conditions responsive to the count in said counter and inputs connected to said counter, said counter being capable of counting through a cycle comprising of plurality of time intervals, first storage means responsive to the condition of at least one of said logic gates for storing a first output of said sensing circuitry means during a first set of said intervals, second storage means responsive to the condition of a further one of said logic gates during a second set of said time intervals for storing a second and later output of said sensing circuitry means, a memory device enabled for a change in its output state in response to the output of a third one of said logic gates during a third set of said time intervals comprising at least one of said intervals, said output state determining whether or not a cleaning operation will be carried out in the next cycle of intervals, further logic gating means responsive to the magnitude and polarity of the difference of the signals appearing on said first and second storage means and further responsive to said output state of said memory device for causing the output state of said memory device to order cleaning in the next cycle of intervals in the event that the output of said first storage device exceeds that of said second storage device and no cleaning was carried out in the present cycle or alternatively in the event that the output of said second storage device exceeds that of said first storage device and cleaning was carried out in the present cycle, the output state of said memory device being ordering no cleaning in the next cycle under other combinations of differences between the outputs of said storage devices and cleaning or noncleaning during the present cycle, means responsive to an output of said counter occurring between storage of said first and second outputs by said storage devices for causing energization of said cleaning electrodes in response to the presence at such time of output state of said memory device ordering cleaning.

17. In an electrochemical grinding machine having a grinding unit driving a grinding device for grinding a workpiece, the improvement comprising:
 an energy source;
 a cleaning electrode connectable to said energy source and positioned in spaced relation to said grinding device so as to define a cleaning gap therebetween, said cleaning electrode being spaced from said workpiece along the path of the working face of said grinding device;
 sensing means for sensing the condition of said working face of said grinding device;
 decision means connected to said energy source and capable of an output condition for causing connection of said cleaning electrode to said energy source;
 storage means connected to said sensing means for storing first and second signals corresponding to the output of said sensing means at first and second points in time, respectively;
 comparator means connecting said storage means and said decision means and responsive to a preselected relationship between said first stored signal, said second stored signal and the existing output condition of said decision means for causing said decision means to produce an output condition which will subsequently cause energization of said cleaning electrode by said energy source.

18. The device of claim 17 including timing means connected to said storage means for sequentially causing said storing of said first signal, energization of said cleaning electrode by said energy source if said energy source has been enabled by said decision means, storage of said second signal, and comparison of said first stored signal, said second stored signal and the output state of said decision means.

19. In an electrochemical grinding machine having a grinding device for grinding a workpiece, the improvement comprising:
 an energy source;
 a cleaning electrode connectable to said energy source and positioned in spaced relation to said grinding device to define a cleaning gap therewith, said cleaning electrode being spaced from said workpiece along the path of the working face of said grinding device;
 sensing means for sensing the condition of said working face;
 means connected to said sensing means for sampling the output of said sensing means and for retaining a first sample;
 further means connected to said sensing means for again sampling the output of said sensing means at a point later in time than said first mentioned sampling thereof and retaining a second sample;
 means connected to said means for sampling and further means for comparing said first sample and said second sample;
 means connected to said comparing means and said energy source responsive to the result of said comparison and which when such comparison shows an improvement in the condition of said working face from said first sample to said second sample and an energization of said cleaning electrode has intervened between said first and second samples causes connection of said cleaning electrode to said energy source.

20. In an electrochemical grinding machine having a grinding device for grinding a workpiece, the improvement comprising:
 an energy source;

a cleaning electrode connectable to said energy source and positioned in spaced relation to said grinding device for defining a cleaning gap therewith, said cleaning electrode being spaced from said workpiece along the path of the working face of said grinding device;

means for sensing the condition of said working face including a source of current, voltage dropping means connected to said current source and in circuit with an electrolytic gap, one side of which gap is defined by said working face, and means for detecting the voltage drop across said voltage dropping means;

comparator means having a first input connected to the output of said sensing means and a second input connected to a source of reference potential, said reference potential corresponding to a desired, partially clean condition of said working face wherein an additional increment of cleaning of said working face would result in an increase in current flow through said gap; and means connected between said comparator means and cleaning electrode and responsive to the output of said comparator means for causing connection of said celaning electrode to said energy source in response to a difference between said reference signal and sensed signal of such magnitude and sign as to indicate that said grinding device requires further cleaning.

21. In a method for cleaning the grinding device of an electrochemical grinding machine while it is in operation, wherein a current flow is established between a workpiece and said grinding wheel to remove material from the workpiece, waste material thereby accumulating on said grinding wheel, the steps of:

sensing the level of waste material on the grinding device by applying a potential between the grinding wheel and a sensing electrode spaced therefrom so as to establish a sensing current flow therebetween;

selecting a useful level of waste material to be maintained on the grinding device corresponding to a level of current flow between the grinding device and an adjacent electrode in a range between a maximum current flow and a lesser current flow, said lesser current flow corresponding to a greater level of waste material on the grinding wheel;

in response to said sensing and said selection of said waste material level to be maintained, causing current flow between said grinding device and a cleaning electrode spaced therefrom in a manner to substantially maintain said waste material at said useful level on said grinding device.

22. The method of claim 21 including generating a second signal from said sensed current flow, providing a preselected reference signal corresponding to said greater level of waste material, comparing said sensed signal and said reference signal, and causing said current flow between said cleaning electrode and grinding device only when said comparison indicates a level of waste exceeding said greater level.

23. In a method for cleaning a grinding device on an electrochemical grinding machine while it is in operation, the steps of:

generating a first potential between said grinding device and a workpiece sufficient to remove material from said workpiece and thereby accumulating waste material on said grinding device;

sensing the condition of the grinding device at two times separated by an interval to determnie if the grinding device should be cleaned;

comparing the two sensed values of the grinding device condition to discover a change in sensed value;

storing an indication of whether or not a cleaning operation was performed on said grinding device during said interval;

determining in response to one preselected relation of said change to said stored indication that a cleaning operation is to occur, and subsequently energizing a cleaning electrode with a second potential for a further such interval to cause an increment of said waste material to be removed from said grinding device, but determining in response to another and different preselected relation of said change and stored indication that no cleaning operation is to occur in said further interval.

References Cited

UNITED STATES PATENTS

| 2,793,992 | 5/1957 | Heuser | 204—143 |
| 2,905,605 | 9/1959 | Keeleric | 204—143 |
| 2,939,825 | 7/1960 | Faust et al. | 204—143 |
| 2,950,239 | 8/1960 | Williams | 204—224 |
| 3,162,588 | 12/1964 | Bell | 204—224 |
| 2,920,026 | 1/1960 | Kistler | 204—224 X |

FOREIGN PATENTS

| 763,109 | 12/1956 | Great Britain | 204—217 |

JOHN H. MACK, Primary Examiner

N. A. KAPLAN, Assistant Examiner

U.S. Cl. X.R.

204—224, 129.1, DIG 12